US 11,087,101 B2

United States Patent
Hale et al.

(10) Patent No.: US 11,087,101 B2
(45) Date of Patent: Aug. 10, 2021

(54) DUAL FREQUENCY NFC/RFID CARD FOR SELF SERVICE BAGGAGE CHECK AND METHOD

(71) Applicant: PAP Investments, Ltd., Dallas, TX (US)

(72) Inventors: Michael J. Hale, Nashville, TN (US); Kevin J. Pease, Mount Juliet, TN (US); Peter A. Pyhrr, Cedar Hill, TX (US)

(73) Assignee: PAP Investments, Ltd., Dallas, TX (US)

( * ) Notice: Subject to any disclaimer, the term of this patent is extended or adjusted under 35 U.S.C. 154(b) by 0 days.

(21) Appl. No.: 16/180,875

(22) Filed: Nov. 5, 2018

(65) Prior Publication Data
US 2019/0156078 A1   May 23, 2019

Related U.S. Application Data

(60) Provisional application No. 62/581,364, filed on Nov. 3, 2017.

(51) Int. Cl.
  *G06Q 90/00*    (2006.01)
  *G06Q 30/00*    (2012.01)
  (Continued)

(52) U.S. Cl.
  CPC ... *G06K 7/10297* (2013.01); *G06K 19/07758* (2013.01)

(58) Field of Classification Search
  CPC ....... G06K 19/07707; G06K 19/07726; G06K 19/12; G06K 19/14; G06K 19/04;
  (Continued)

(56) References Cited

U.S. PATENT DOCUMENTS

| 4,978,146 A | 12/1990 | Warther et al. |
| 5,495,981 A | 3/1996 | Warther |

(Continued)

FOREIGN PATENT DOCUMENTS

| EP | 2887272 A1 | 6/2015 |
| EP | 3046268 A1 | 7/2016 |
| WO | 2013070747 A1 | 5/2013 |

OTHER PUBLICATIONS

Future Travel Experience, "Next Generation Check-In: Permanent bag tag sets new benchmark for passenger and baggage processing" (Jul. 2011) (http://www.futuretravelexperience.com/2011/07/next-generation-check-in-anew-benchmark-for-passenger-and-baggage-processing/) (last visited Oct. 30, 2017).

(Continued)

*Primary Examiner* — Thien T Mai
(74) *Attorney, Agent, or Firm* — Garvey, Smith & Nehrbass, Patent Attorneys, L.L.C.; Julia M. FitzPatrick; Gregory C. Smith

(57) ABSTRACT

A card is made from rigid plastic confirming to ISO 7810 ID-Type 1 card constructed of PVC, PET, Styrene, Polypropylene, Tyvek, or other synthetic material that is 7 mil to 30 mil thick (180 to 760 microns) with both an embedded High Frequency (HF) RFID chip and a Ultra High Frequency (UHF) chip; each chip is affixed to its own unique antenna that is appropriately tuned to operate in its designated frequency range in a passive manner such that the antenna are not physically connected to a power source such as a battery; the HF chip is encoded using NFC Data Exchange Format (NDEF) with code that directs a NFC enabled smartphone, tablet, or similar device to a dedicated website or app where it initializes the interaction by delivering in the NFC encode string identification data unique to that card's UHF RFID chip; the NFC encode string may include such data as the UHF chip's Tag Identification (Continued)

Number (TID), a serial number assigned to the tag that is encoded into the UHF chip's EPC memory; the delivery of the unique identifying information from the card's UHF chip allows the website or app to associate the tag with the passenger's itinerary by associating it with a ticket number, reservation number, frequent traveler number, or other identification element that is unique to the specific passenger for whom the tag is associated; wherein once the card's NFC is used to link the tag to the reservation the bag can be tracked through the transport carrier's baggage handling system using the card's embedded UHF RFID capability.

57 Claims, 6 Drawing Sheets

(51) Int. Cl.
    *G06K 7/10* (2006.01)
    *G06K 19/077* (2006.01)
(58) Field of Classification Search
    CPC ....... G06K 19/06028; G06K 19/06187; G06K 19/07749; G06K 19/06037; G06K 19/07771; G06K 7/10366; G06K 5/00; G06K 19/0723; G06K 19/07767; G06K 9/00979; G06K 19/08; G06K 7/1404; G06K 7/1413; G06K 7/1417; G06K 19/0779; G06K 19/07758; G06K 19/0717; G06K 19/0727; G06K 7/10297; G06K 19/07; G06K 19/0716; G06K 19/07345; G06K 19/077; G06K 19/07713; G06K 19/0772; G06K 2019/06253; G06K 9/00671; G06K 19/06056; G06K 19/06093; G06K 19/07766; G06Q 10/0833; G06Q 10/02; G06Q 20/384; G06Q 10/08; G06Q 10/08355; G06Q 10/00; G06Q 10/025; G06Q 10/0836; G06Q 10/1093; G06Q 10/10; G06Q 50/14; G06Q 30/0261; G06Q 30/0265; G06Q 30/0281; G06Q 20/18; G06Q 20/202; G06Q 20/206; G06Q 20/32; G06Q 20/40; G06Q 20/401; G06Q 30/00; G06Q 20/208; G06Q 20/3226; G06Q 20/3274; G06Q 50/30; A45C 13/42; G08C 17/02; G06F 3/14
    See application file for complete search history.

(56) References Cited

U.S. PATENT DOCUMENTS

| 6,039,356 | A | 3/2000 | Warther et al. |
|---|---|---|---|
| 7,195,159 | B2 | 3/2007 | Sloan et al. |
| 7,843,345 | B2 | 11/2010 | Lazar |
| 7,845,569 | B1 | 12/2010 | Warther et al. |
| 8,052,061 | B2 | 11/2011 | Warther |
| 9,087,281 | B2 | 7/2015 | Maguire et al. |
| 9,224,084 | B2 | 12/2015 | Warther |
| 9,315,278 | B2 | 4/2016 | Song et al. |
| 9,582,750 | B2 | 2/2017 | Forster |
| 9,918,537 | B2 | 3/2018 | Warther |
| 10,068,398 | B1* | 9/2018 | Hodge ............... G08B 21/0261 |
| 2002/0134836 | A1* | 9/2002 | Cash ....................... G06Q 10/08 235/385 |
| 2004/0193676 | A1* | 9/2004 | Marks ................... G06F 16/955 709/203 |
| 2006/0244676 | A1* | 11/2006 | Uesaka .................... H01Q 1/22 343/895 |
| 2010/0078475 | A1 | 4/2010 | Lin et al. |
| 2011/0156864 | A1* | 6/2011 | Green .............. G06K 19/07749 340/5.2 |
| 2012/0062367 | A1* | 3/2012 | Warther ................. G06K 19/14 340/10.1 |
| 2012/0098642 | A1* | 4/2012 | Krawczewicz .. G06K 19/07707 340/10.1 |
| 2016/0328639 | A1* | 11/2016 | Cohn ............... G06K 19/06037 |
| 2016/0342883 | A1 | 11/2016 | Huhtasalo |
| 2016/0379102 | A1 | 12/2016 | Ferguson |
| 2017/0004444 | A1* | 1/2017 | Krasko ............. G06Q 10/0833 |
| 2017/0054474 | A1 | 2/2017 | Haas et al. |
| 2017/0083901 | A1 | 3/2017 | Spencer, II |

OTHER PUBLICATIONS

RFID vs. NFC: What's the Difference? (2013) (available at https://blog.atlasrfidstore.com/rfid-vs-nfc) (last visited Oct. 31, 2018).

CNBC, "Digital bag tags could make paper luggage tags obsolete" (Nov. 13, 2013) (https://www.cnbc.com/2013/11/13/digital-bag-tags-could-make-paper-luggagetags-obsolete.html) (last visited Oct. 30, 2017).

RFID for brand protection (2014) (www.nxp-rfid.com) (last visited Oct. 2017).

Future Travel Experience, "Air France-KLM: Our new permanent bag tag and tracking device can benefit the entire industry" (Mar. 2014) (http://www.futuretravelexperience.com/2014/03/air-france-klm-new-permanent20bag-tag-and-tracking-device-can-benefit-the-entire-industry/) (last visited Oct. 30, 2017).

NTAG213/215/216, NFC Forum Type 2 Tag compliant IC with 144/504/888 bytes user memory (Jun. 2, 2015).

RFID Journal, "FastTrack's Vision for Smart Luggage—and Happier Flyers" (Jun. 9, 2015) (http://www.iotjournal.com/articles/view?13132) (last visited Oct. 30, 2017).

2nd generation NTAG enables massmarket NFC applications (NXP NFC tag ICs NTAG® 21x) (2016).

Tracking Baggage with RFID (Jun. 9, 2016) (http://www.trustpointinnovation.com/blog/2016/06/09/tracking-baggage-with-rfid/) (last visited Nov. 20, 2017).

ViewTag | The World's First Permanent Reusable RFID Luggage Tag (2017) (http://www.vanguardid.com/ViewTag.aspx) (last visited Oct. 30, 2017).

"A Luggage Control System Based on NFC and Homomorphic Cryptography", vol. 2017 (https://www.hindawi.com/journals/misy/2017/2095161/) (last visited Nov. 20, 2017).

NTAG 413 DNA delivers higher security & unique experiences with each tap (NXP® NTAG® 413 DNA) (Mar. 2017).

NT4H1321, NTAG 413 DNA Secure Unique NFC Message for direct access to web services (Jun. 1, 2017).

Indonesian Journal of Electrical Engineering and Computer Science, "Baggage Claim in Airports using near Field Communication", vol. 7, No. 2, Aug. 2017, pp. 442-448.

PCT International Search Report and Written Opinion of International Searching Authority for International Patent Application Serial No. PCT/US2018/059236 (dated Mar. 11, 2019).

* cited by examiner

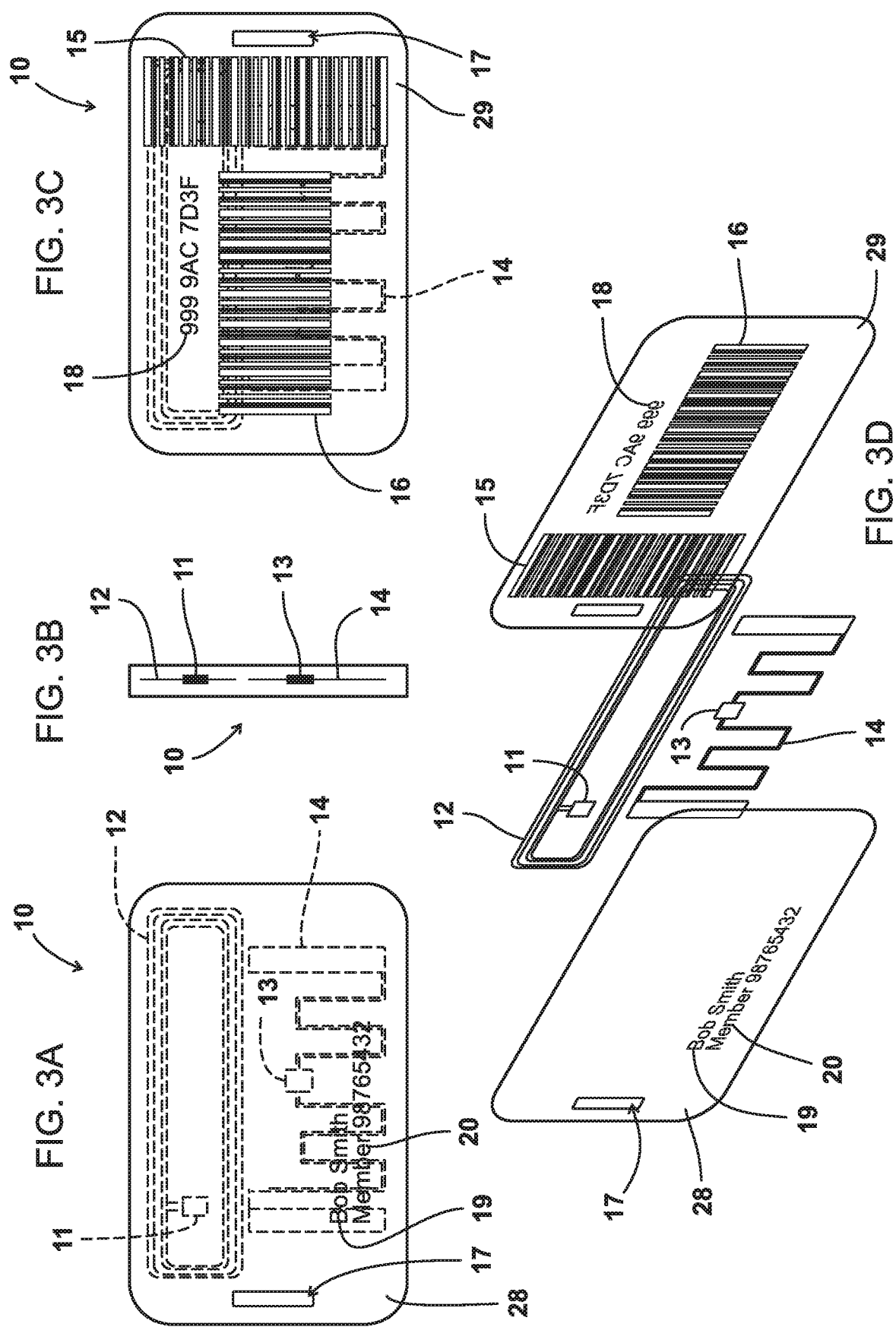

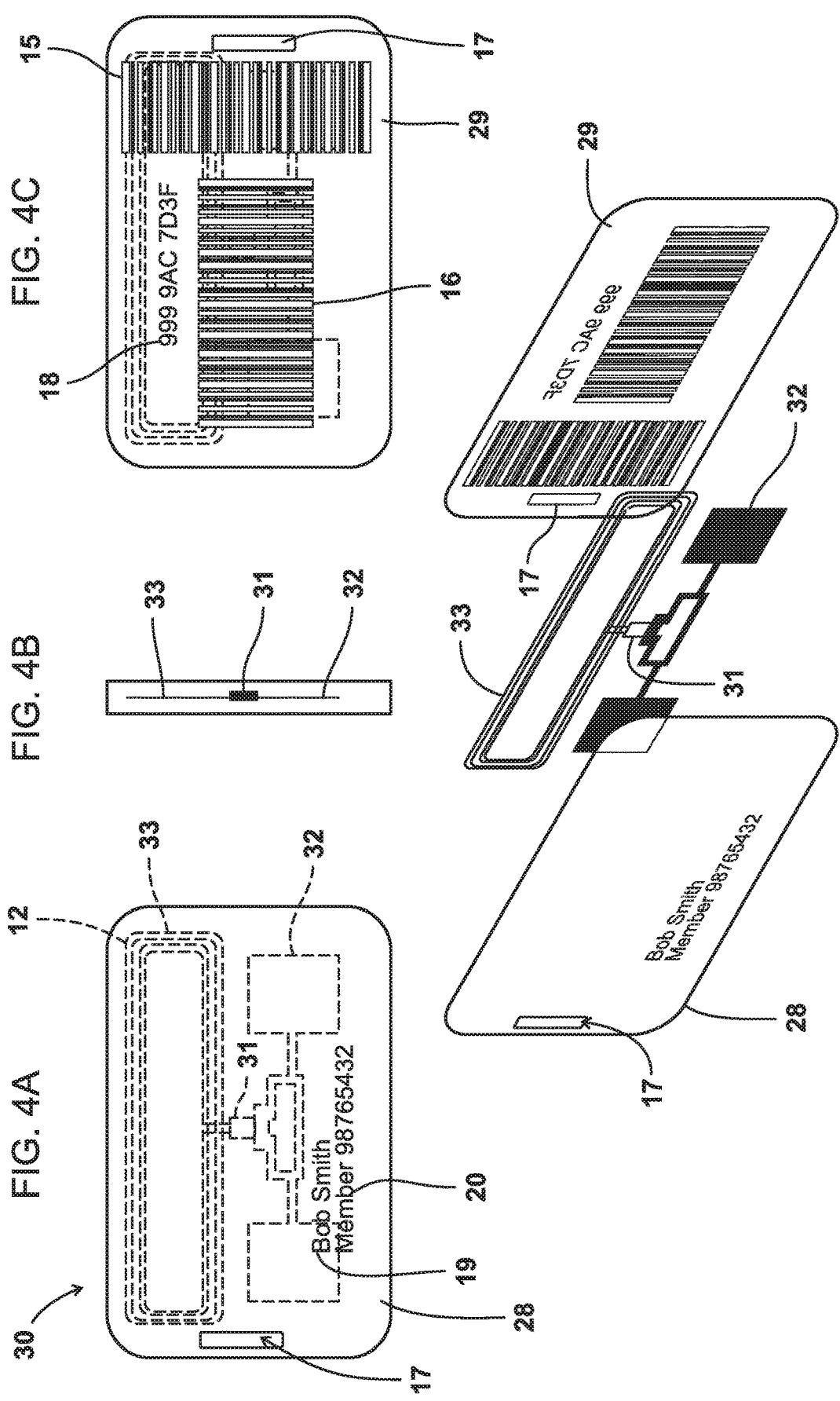

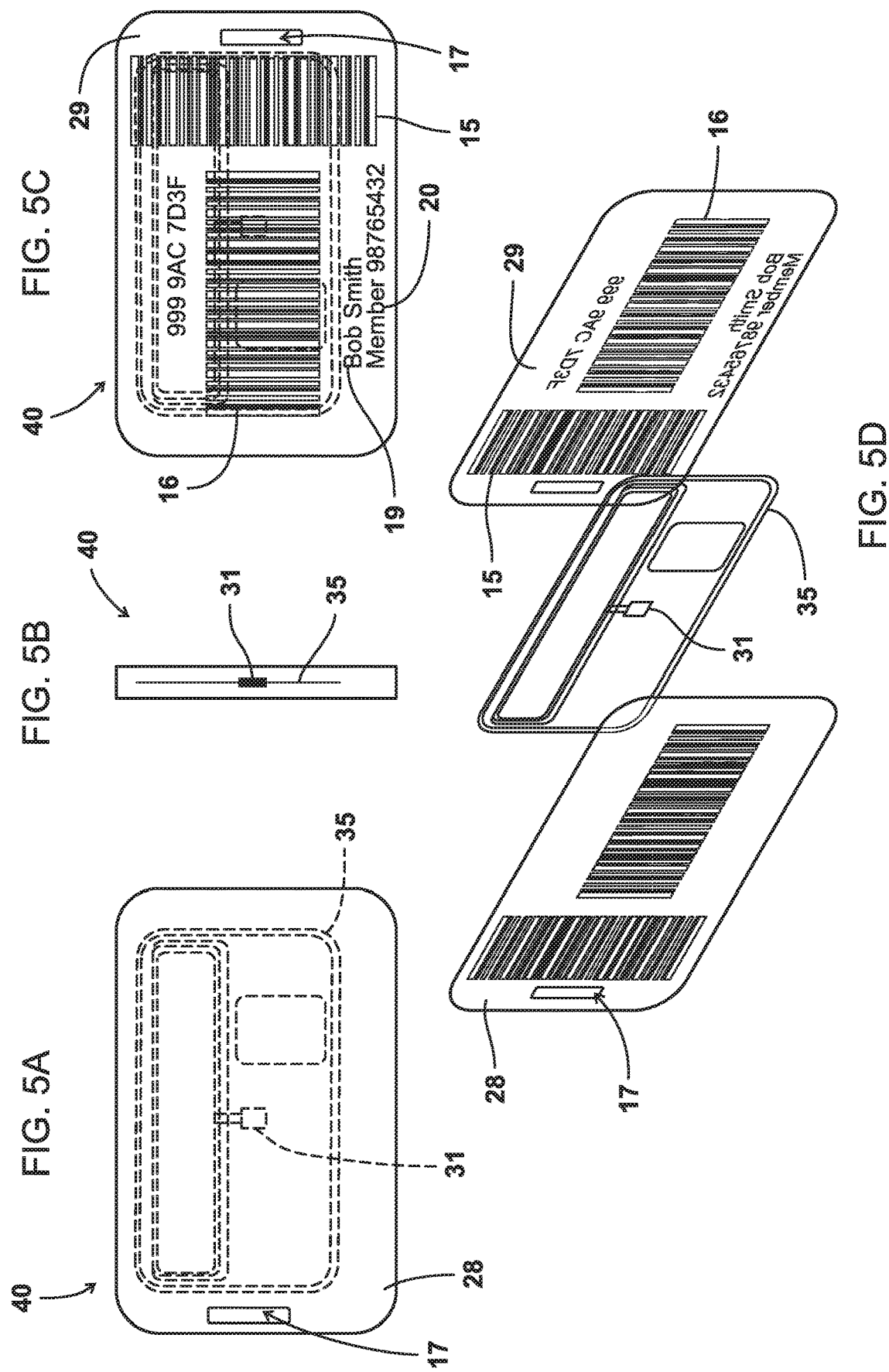

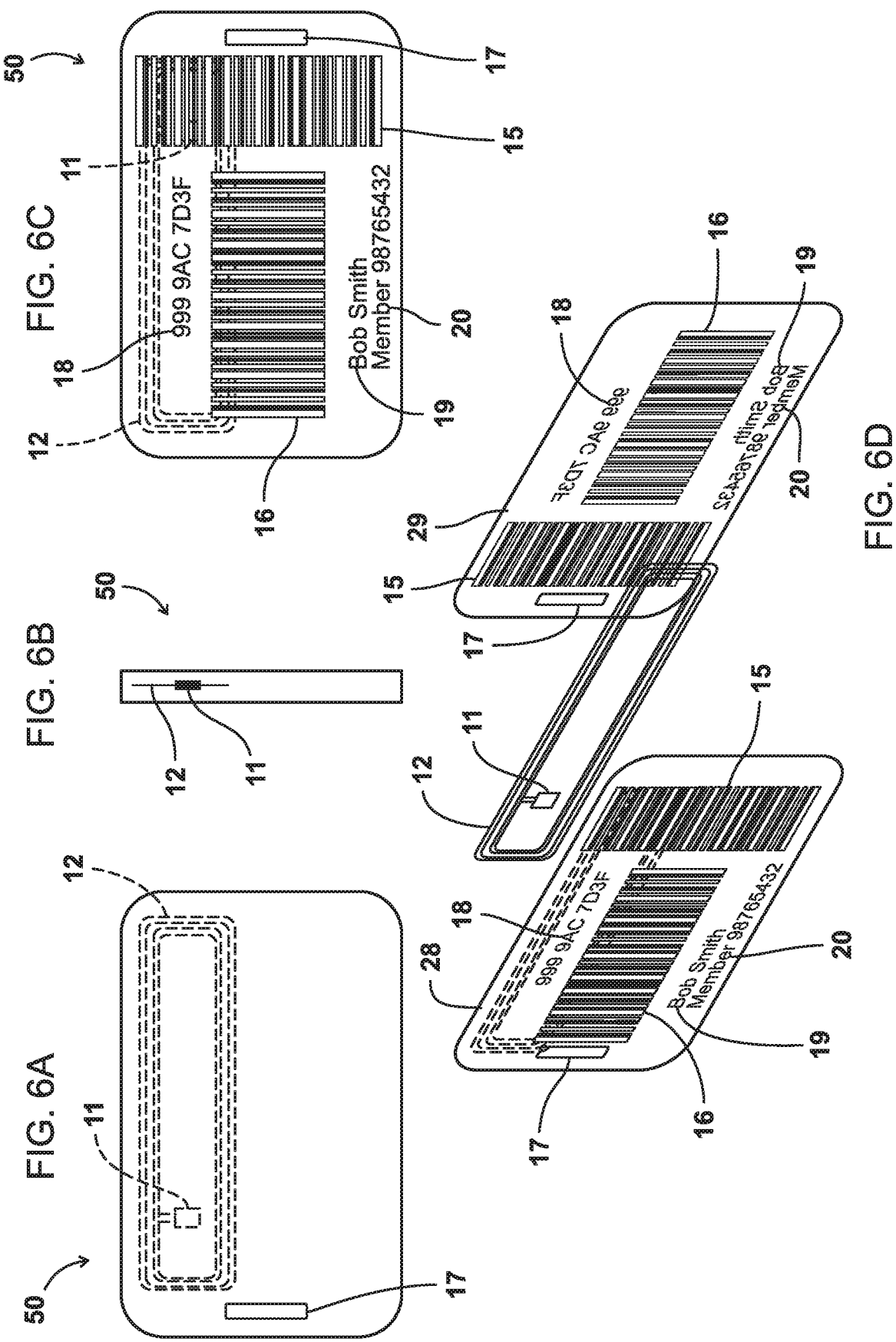

DUAL FREQUENCY NFC/RFID CARD FOR SELF SERVICE BAGGAGE CHECK AND METHOD

CROSS-REFERENCE TO RELATED APPLICATIONS

This application claims the benefit of and/or priority to U.S. Provisional Patent Application Ser. No. 62/581,364, filed on 3 Nov. 2017, which is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a self-service passenger baggage check apparatus, system and method that includes baggage tags with both Near Field Communication (NFC) and Radio-Frequency Identification (RFID) technology and applications. A traveler uses the NFC technology of the baggage tag for remote baggage check-in, using their own NFC enabled device and eliminating the need to check-in baggage on-site at transport operator's or transport carrier's kiosk or with personnel, for example. After checking in the baggage, and after arriving at the terminal, travelers can just drop their bags/luggage at a baggage drop area. The RFID technology of the baggage tag can then be used in conjunction with the transport carrier's or operator's existing RFID tracking system for processing, handling, and transporting of the bags/luggage throughout the journey. The traveler can check the status and location of the bags/luggage throughout the journey using the NFC technology of the baggage tag and their smart device to access status information.

2. General Background of the Invention

The push to reduce labor cost relating to baggage checking for travelers has caused many transit operators to reduce curbside and counter staff assigned to checking passenger baggage and has given rise to the introduction of self-service kiosks where a traveler can check their own bag and apply the necessary tag without the assistance of the transport operator's staff. Inconveniences and delays caused by the current method of checking baggage can be irritating to frequent travelers who are having to maintain tight travel schedules and are easily frustrated by the time it takes to check a bag while traveling.

RFID technology is generally used by transport carriers in handling and processing bags and luggage checked by travelers from in-take at a departing terminal or port, throughout the journey, to the baggage claim by the passenger at the destination terminal or port.

In General, as described in RFID versus NFC (available at https://blog.atlasrfidstore.com/rfid-vs-nfc and incorporated herein by reference thereto), Radio Frequency Identification (RFID) is a process by which items can be uniquely identified using radio waves. Typically, an RFID system comprises a tag, a reader, and an antenna. The reader can send an interrogating signal to the tag via the antenna, and the tag can respond with its unique information. RFID tags can be either active or passive.

Near Field Communication (NFC) is a branch within the family of RFID technology, and a branch of High-Frequency (HF) RFID. Both operate at the 13.56 MHz frequency. NFC provides a secure form of data exchange, and an NFC device can be used as both an NFC reader and an NFC tag, which allows NFC devices to communicate peer-to-peer.

Active RFID tags contain their own power source, e.g., a battery which can enable it to broadcast with a read range of up to about 100 meters. This is considered a long-read range. Passive RFID tags do not have their own power source and are powered by electromagnetic energy transmitted from an RFID reader. Passive RFID tags can have a read range from near contact and up to about 25 meters.

Passive RFID tags primarily operate at three frequency ranges:

Low Frequency (LF) 125-134 kHz
High Frequency (HF) 13.56 MHz
Ultra High Frequency (UHF) 856 MHz to 960 MHz Near-field communication devices generally operate at the same frequency (13.56 MHz) as HF RFID readers and tags. Typical standards and protocols of the NFC format is based on RFID standards outlined in ISO/IEC 14443 (International Organization for Standardization/International Electrotechnical Commission (IEC), FeliCa (Felicity Card) technology, and the basis for parts of ISO/IEC 18092. These standards deal with the use of RFID in proximity cards.

Because NFC devices must be in close proximity to each other, usually no more than a few centimeters, NFC technology can provide secure communication between personal consumer devices such as smartphones.

In the prior art, the idea of using NFC in baggage tags has emerged. In one proposed system as described in "A luggage Control System Based on NFC and Homomorphic Cryptography" by Alvarez-Diaz, Caballero-Gil, and Burmester (University of La Laguna, Tenerife, Spain and Florida's State University, Volume 2017 (2017), Article ID 2095161, 11 pages, https://doi.org/10.1155/2017/2095161) (which is hereby incorporated herein by reference), Near Field Communication (NFC) baggage tags are utilized wherein an airport server is responsible for registering new luggage and for generating a boarding pass and the set of data for NFC tag. After registering the luggage, the system returns the encrypted and signed data corresponding to the flight so that this information can be written automatically to the NFC luggage tags. Information about the luggage management process is added to the NFC tag at each control point, from the delivery point at the original airport to its placement inside the airplane, until the passenger receives its luggage at the baggage claim at the destination airport. This requires writing of information to the chip in the tag at different stages throughout the journey. Smartphones and airport check-in points are used in this prior art system to write data on the NFC tags. When passengers/travelers check-in their luggage, NFC tags attached to the luggage are written with the configuration data. These system elements can only write to the tags and do not possess the ability to read stored information. At each point, an NFC reader allows the reading and writing to the NFC tags. A Paillier Cryptosystem is used, which is an additive homomorphic cryptosystem to guard against unauthorized device reading and writing to the NFC tags.

The operational independence between airports is a key factor in the above basic scheme. A unique entity with the ability to decrypt the content of NFC tags is an airport server, which provides a user with the corresponding data and boarding pass. However, this restriction can cause a problem rather than a solution if it is necessary to decrypt the content of the tag at the destination airport. To solve this issue between the departure airport and the airplane and between the airplane and the destination airport, the content of the NFC tag is changed at each control point, but the original data stored on the tag does not change. The airplane plays the role of intermediary between airports to avoid that each airport must know the public key of each other airport. Basically, since the above described system requires secure encoding of the chip at multiple points, it requires the airplane itself to transfer a key from the departure airport to the destination airport such that the destination airport can have the key needed to read and write to the tag as the bag continues its journey.

The NFC baggage tags also have short read/write distance, e.g., about 1 to 10 centimeters (cm) distance, and this is not practical for baggage systems that need to read tags while on moving conveyor systems and require the read distance of several meters allowed by Ultra High Frequency (UHF) of RFID technology.

Another proposed baggage system that uses a read/write feature of NFC in baggage tags is described in "Baggage Claim in Airports using near Field Communications", Indonesian Journal of Electrical Engineering and Computer Science, Vol. 7, No. 2, August 2017, pp. 442-448 (which is hereby incorporated herein by reference). A passenger's identity and a baggage's identity are saved in a passenger's NFC and the NFC tag. The data stored in the NFC tag contains the encrypted information to activate or deactivate an alarm. The passenger's NFC device has a password to deactivate the alarm. The system contemplates that devices which have NFC can access data from an RFID-enabled object. The NFC tag is a passive device which can be used to communicate with an active NFC device. NDEF encoding of the NFC chip can be used to communicate various forms of data to an NFC enabled device. The described encoding scheme is one where the tag is encoded with the passenger details and a code to deactivate an alarm at the baggage reclaim area when it is checked by security staff using NFC readers to check the tag against the passenger's receipt or ticket. The system can be used to speed up the security verification of bag ownership for bags being claimed by a bag owner upon arrival at a baggage claim area and addresses the labor requirement for checking bags being reclaimed. However, the system does not speed up the process of checking the bag prior to, or at the start of the journey, and does not reduce labor or improved efficiency of the bag check process at the beginning of the journey. The system is also limited to handling one bag of a passenger, and the limits are the result of the encoding of passenger data onto an NFC chip of the tag.

Another proposed system described in EP 2887272A1 uses a card that receives a message through one radio module (NFC or RFID) and then extracts the data and converts the ID to a format that is compatible with the other one of the modules. One radio form on the card receives and processes the data in a way that the other radio form can store and use in its area. A controller (in card) can receive a request through one module, select the application data in the other, and emit the selected data via the other radio module. A message can be received through one of the radio modules and security policy can be updated on the card. A rewrite by a field device can occur that interacts with the tag in either frequency range. A controller can apply the security policy when selecting data from the memory.

In another proposed system using a digital bag tag (see CNBC Digital Bag Tag Article about British Airways Digital Bag Tag, available at https://www.cnbc.com/2013/11/13/digital-bag-tags-could-make-paper-luggage-tags-obsolete.html, which is hereby incorporated herein by reference) NFC from a phone is used to push flight detail to a tag. The tag can use a Kindle like electronic link to keep a unique barcode displayed and readable by scanners. Information of the tag can be dynamically changed; the tag can be reprogrammed/rewritten for each trip.

In U.S. Pat. No. 8,052,061, a programmable electronic flexible sheet display is a visibly accessible portion on the tag. Communication is either with RFID or a two-dimensional barcode. Communicating with a mobile device is done with use of the two-dimensional barcode.

Permanent baggage tags have been proposed that use battery power, but there is still a need in the art for a passive permanent baggage tag, that does not require battery power, and which can be used for multiple trips.

There is also a need in the art for a baggage tracking system that utilizes a bag tag that includes NFC technology, (e.g., a High Frequency NFC chip or NFC element, which can be an NFC HF RFID chip), and RFID technology (e.g., UHF RFID technology, which can be a UHF RFID chip), wherein the NFC technology can be used by a traveler for checking in luggage to a transport carrier's baggage tracking system and for checking the status of luggage, and wherein the RFID technology can be used with a carrier's existing RFID tracking system for processing, handling and transport of luggage throughout the journey.

There is also a need in the art for a baggage tracking system that utilizes a bag tag that includes NFC technology (e.g., a High Frequency NFC chip or NFC element, which can be an NFC HF RFID chip), and RFID technology (e.g., UHF RFID technology, which can be a UHF RFID chip), wherein identifiers for the dual frequency tag are generated in advance and are already permanently encoded in the tag (not dynamically changeable) when given to a traveler or passenger who has the tag in possession prior to the arrival at an carrier check-in point, desk or kiosk, for example, and which does not involve re-writing of information on the tag during a bag's journey. A carrier's baggage management/tracking system can then store the scanned data in a central server that tracks it against the passenger record so that data does not need to be subsequently written to the NFC tag, but can be written to the server.

There is also a need for a baggage tracking system and method wherein a carrier/transport carrier, e.g., an airline carrier (e.g., Delta Air Lines, American Airlines, etc.), a train carrier (e.g., Amtrack, SNCF French National Railway Company, etc.), a bus carrier (e.g., Greyhound, MegaBus, etc.), a ferry or ship carrier (e.g., a cruise line, etc.), etc., assigns identifiers to an RFID/NFC tag and associates the identifiers with a passenger, instead of having identifiers dynamically assigned by a terminal or port operator's server upon check-in, for example.

There is also a need in the art, wherein data is pre-encoded at the time a baggage tag is made and wherein the data remains permanently in the chip, e.g., an NFC chip of a baggage tag, and is not erased and rewritten during handling and processing of baggage and/or for each trip of the baggage. There is also a need in the art wherein data encoded on a UHF RFID chip is static/permanent and not rewritten or changed during handling and processing of a bag in baggage system. There is also a need in the art for a system and method wherein data is not rewritten in an NFC chip in a baggage tag throughout the processing and handling of the bag through the different stages of the bag's journey.

There is a need in the art for system and method wherein the encoded data on a chip in a baggage tag remains static and is not changed after the chip is initially encoded.

There is a need in the art for a system and method wherein a carrier's baggage management system is utilized to store scanned or inputted data in a central server that tracks the data against the passenger record so that the data does not need to be subsequently written to the NFC tag, but can be written to the server.

There is a need in the art for a baggage tag using two distinct antennas/circuits with separate and distinct chips for each frequency (HF/UHF).

There is a need in the art for a baggage tracking system utilizing both an NFC enabled device (e.g., an NFC enabled phone or tablet) and a card/tag that are both mobile and portable.

The following patents and published patent applications are incorporated herein by reference: U.S. Pat. Nos. 4,978,146; 5,495,981; 6,039,356; 7,195,159; 7,843,345; 8,052,061; 9,087,281; 9,224,084; 9,582,750; 9,918,537; US Publication No. 2016/0342883; US Publication No. 2017/0054474; US Publication No. 2017/0083901; European Patent Application No. EP 2887272; European Patent Application No. EP 3046268.

The following information and webpages are incorporated herein by reference, which were filed with U.S. Provisional Patent Application Ser. No. 62/581,364, on 3 Nov. 2017:

The World's First Permanent Reusable RFID Luggage Tag (http://vanguardid.com/ViewTag.aspx);
Digital Bag Tags Could Make Paper Luggage Tags Obsolete (https://www.cnbc.com/2013/11/13/digital-bag-tags-could-make-paper-luggage-tags-obsolete);
FastTrack's Vision for Smart Luggage (http://www.iotjournal.com/articles/view?13132)
Next Generation Check-In (http://futuretravelexperience.com/2011/07/next-generation-check-in-a-new-benchmark);
Air France-KLM (http://www.futuretravelexperience.com/2014/03/air-france-klm-new-permanent-bag-tag);
75017595-5 RFID For Brand Protection[1][2].pdf;
NT4H1321_SDS[2][2].pdf;
NTAG_Leaflet_updateFINAL2[3][1].pdf;
NTAG213_215_216[3][1].pdf;
NTAG-413-DNA_leaflet_web[1][1].pdf.

Also incorporated herein by reference are the following webpages, which were filed with U.S. Provisional Patent Application Ser. No. 62/581,364, on 3 Nov. 2017:

https://www.cnbc.com/2013/11/13/digital-bag-tags-could-make-paper-luggage-tags-obsolete.html;
http://www.iotjournal.com/articles/view?13132;
http://www.futuretravelexperience.com/2011/07/next-generation-check-in-a-new-benchmark-for-passenger-and-baggage-processing/;
http://www.futuretravelexperience.com/2014/03/air-france-klm-new-permanent-bag-tag-and-tracking-device-can-benefit-the-entire-industry/;
http://www.vanguardid.com/ViewTag.aspx.

BRIEF SUMMARY OF THE INVENTION

The present invention provides a solution to the issues mentioned above.

The proposed solution, while still a self-service function, allows a traveler to keep a permanent tag on the traveler's bag with a passive Ultra High Frequency (UHF) RFID chip and use a second passive High Frequency (HF) NFC chip (which can be an HF RFID chip) within the tag to link the tag with their travel itinerary using their own smartphone, tablet, or other NFC enabled device. The proposed solution allows the passenger to associate a passive dual frequency (UHF/HF) baggage tag to their travel itinerary without requiring them to stop at a kiosk or wait in line for an agent to issue a traditional baggage tag. The UHF element of the tag is designed to function with a transport carrier's RFID baggage tracking system, and the tag may also have a barcode printed on it for use in cases where the transport operator uses that technology for their baggage sortation and tracking system.

One or more preferred embodiments of the present invention allow a traveler to check the traveler's bag using the NFC technology within their smartphone or tablet, which can occur remotely, e.g., off airport grounds, or can occur at the airport but without having to visit a baggage check kiosk or interact with bag-check personnel. The goal of the invention is to create a more efficient system that improves the convenience of the passenger while assisting the transport carrier in providing better service at a lower unit labor cost.

In one or more preferred embodiments, a baggage tag or card is made from rigid plastic conforming to ISO 7810 ID-Type 1 card standards (or to other similar standards or systems currently available or to be developed in the future) that is about 7 mils to 30 mils thick (180 to 760 microns). The tag or card can be constructed of Polyvinyl Chloride (PVC), Polyethylene Terephthalate (PET), styrene, polypropylene, Tyvek® or other synthetic material that is about 7 mils to 30 mils thick (180 to 760 microns) with both an embedded Ultra High Frequency (UHF) RFID chip and a High Frequency (HF) chip. In one or more preferred embodiments, each chip is affixed to its own unique antenna that is appropriately tuned to operate in its designated frequency range in a passive manner such that the antennas are not physically connected to a power source such as a battery.

The HF chip is encoded using NFC Data Exchange Format (NDEF) with executable code that can direct an NFC enabled device, e.g. smartphone, tablet, or similar smart device that is NFC enabled, to a dedicated website or software application that can be downloaded to a user's device ("app") where it initializes the interaction by delivering in the NFC NDEF encode string identification data unique to that card's UHF RFID chip; the NFC encode string may include, but not be limited to, such data as the UHF RFID chip's tag Identification number or other unique chip identifier, a serial number assigned to the tag that is encoded into the UHF chip's EPC (Electronic Product Code) memory.

The delivery of the unique identifying information from the card's UHF RFID chip allows the website or app to associate the baggage tag or card with the passenger's itinerary by associating it with a ticket number, reservation number, frequent traveler number, or other identification element that is unique to the specific passenger for whom the baggage tag or card is associated.

Once the baggage tag or card's NFC technology is used to link the baggage tag or card to the passenger's travel reservation, the bag to which the baggage tag or card is coupled can be tracked through the transport carrier's baggage handling system using the baggage tag's or card's embedded UHF RFID capability.

In one or more preferred embodiments, the NDEF encode string includes data for a barcode and/or a human readable number that is unique to a specific baggage tag or card and also serves to support tracking through a baggage tracking system.

In one or more preferred embodiments, a baggage tag or card does not have the embedded UHF RFID chip but is tracked in a baggage tracking system solely by a barcode that is permanently assigned to that specific tag or card.

In one or more preferred embodiments, a baggage tag or card is made from paper or other non-synthetic material having a thickness of about 4 to 36 mils (100 to 915 microns).

In one or more preferred embodiments, a baggage tag or card does not conform to ISO 7810 ID-Type 1 form factor specifications.

In one or more preferred embodiments, a baggage tag or card includes a single chip that can function in both HF and UHF frequency ranges with connection to an antenna specific to each frequency.

In one or more preferred embodiments, a baggage tag or card uses a single chip that can function in both HF and UHF frequency ranges and uses a single antenna designed with said functionality.

In one or more preferred embodiments, a UHF chip of a baggage tag or card has a frequency of about 860 to 960 MHz and can be read from a distance of up to about 20 meters.

In one or more preferred embodiments, a UHF chip of a baggage tag or card has a UHF frequency that can be read at a distance determined by the type of antenna and power of the signal.

In one or more preferred embodiments, an NFC (HF) chip has a frequency of about 13.56 MHz and can be read from a distance of less than about 1 meter.

In one or more preferred embodiments, an NFC (HF) chip has a frequency that can potentially be read from a distance of over about 1 meter as determined by the type of antenna and power of the signal.

In one or more preferred embodiments, an NFC (HF) chip has a frequency that can be read from a distance as determined by the type of antenna and power of the signal.

In one or more preferred embodiments, identifiers for a baggage tag or card, e.g., NFC identifiers, are generated in advance and are already permanently encoded in the baggage tag or card prior to receipt by a passenger or traveler, who has the baggage tag or card in their possession prior to the arrival at the check-in desk or kiosk, and wherein the transport carrier assigns the identifiers to the RFID/NFC baggage tag or card and associates them with the passenger instead of being dynamically assigned by the transport carrier or transport operator server upon check-in.

In one or more preferred embodiments, identifiers for a baggage tag or card, e.g., NFC identifiers, are generated in advance and are already permanently encoded in the baggage tag or card prior to receipt by a passenger or traveler, who has the baggage tag or card in their possession prior to the arrival at the transport facility, and wherein the carrier assigns the identifiers to the RFID/NFC baggage tag or card and associates them with the passenger instead of being dynamically assigned by the transport facility or transport operator or transport carrier server upon check-in.

In one or more preferred embodiments the baggage tag or card is a permanent baggage tag or card.

In one or more preferred embodiments the baggage tag or card can be used by the same traveler or passenger for multiple distinct trips or travel itineraries, wherein the trips or travel itineraries are spaced apart in day, week, month, or yearly intervals.

In one or more preferred embodiments, a lifetime of a baggage tag or card can be 1 to 10 years. In other embodiments, a lifetime of baggage tag or card can be under 1 year. In other embodiments, a lifetime of a baggage tag or card can be over 10 years.

In one or more preferred embodiments the baggage tag or card can be used by more than one traveler or passenger, e.g., by more than one member of the same family, for distinct trips or travel itineraries, wherein the trips or travel itineraries are spaced apart in day, week, month, or yearly intervals, and wherein the card can be linked to more than one traveler or passenger in a traveler's account on a carrier's server and wherein upon check-in of the baggage using a traveler's smart device the specific traveler or passenger for a specific travel itinerary is selected.

In one or more preferred embodiments, the system and/or method does not require the writing of data to the NFC chip in the baggage tag or card for each trip, rather the data is pre-encoded at the time the baggage tag or card is made and remains permanently in the chip and is not erased and rewritten for each trip/travel itinerary.

In one or more preferred embodiments, the system and/or method does not require that information about the luggage management process be added to the NFC chip of the baggage tag or card at each control point, from the delivery point at the original transport facility to its placement inside the transport vessel, vehicle or aircraft, until the passenger receives its luggage at the baggage claim at the destination facility.

In one or more preferred embodiments, the system and/or method does not require writing data to the NFC chip in the baggage tag or card throughout the processing and handling of the bag to which the baggage tag or card is coupled, through the different stages of the bag's journey, rather the encoded data on the NC chip remains static and is not changed after the NFC chip is initially encoded.

In one or more preferred embodiments, the system and method rely on the carrier's baggage management system to store the scanned data in a central server that tracks the scanned data against the passenger record so that data does not need to be subsequently written to the NFC chip of the baggage tag or card but can be written to the server.

In one or more preferred embodiments of the system and method, NFC enabled devices, e.g., smartphones, tablets or other smart devices that are NFC enabled, are used to read stored information, e.g., static permanent data encoded in an NFC chip of a baggage tag or card.

In one or more preferred embodiments of the system and method, baggage tracking system readers or scanners are used to read stored information, e.g., static permanent data encoded in UHF RFID chip of a baggage tag or card.

In one or more preferred embodiments of the system and method, baggage tracking system readers or scanners are used to read stored information, e.g., static permanent data encoded in a machine readable element of a baggage tag or card.

In one or more preferred embodiments of the system and method, NFC enabled devices, e.g., smartphones, tablets or other smart devices that are NFC enabled, are used to read stored information and are not used to write data on baggage tags or cards, e.g., on NFC chips of baggage tags or cards.

In one or more preferred embodiments of a baggage tag or card, an NFC chip of a baggage tag or card, is written with configuration data prior to receipt by a traveler or passenger.

In one or more preferred embodiments of a baggage tag or card, an NFC chip of a baggage tag or card, is written with configuration data prior to a traveler or passenger's arrival at an airport or transportation facility.

In one or more preferred embodiments of a baggage tag or card, an NFC chip of a baggage tag or card, is written with static configuration data (e.g. permanent configuration data that will be not be changed or rewritten throughout the life of the baggage tag or card) prior to receipt by a traveler or passenger.

In one or more preferred embodiments of a baggage tag or card, an NFC chip of a baggage tag or card, is written with static configuration data (e.g. permanent configuration data that will be not be changed or rewritten throughout the life of the baggage tag or card) prior to a traveler's or passenger's arrival at an airport or transportation facility.

In one or more preferred embodiments of a baggage tag or card, a UHF RFID chip of a baggage tag or card, is written with static configuration data (e.g. permanent configuration data that will be not be changed or rewritten throughout the life of the baggage tag or card) prior to receipt by a traveler or passenger.

In one or more preferred embodiments of a baggage tag or card, UHF RFID chip of a baggage tag or card, is written with static configuration data (e.g. permanent configuration data that will be not be changed or rewritten throughout the life of the baggage tag or card) prior to a traveler or passenger's arrival at an airport or transportation facility.

In one or more preferred embodiments of a baggage tag or card, a machine readable element of a baggage tag or card, e.g., that can be read by a baggage tracking system reader or scanner, is written with static configuration data (e.g. permanent configuration data that will be not be changed or rewritten throughout the life of the baggage tag or card) prior to receipt by a traveler or passenger.

In one or more preferred embodiments of a baggage tag or card, a machine readable element of a baggage tag or card, e.g., that can be read by a baggage tracking system reader or scanner, is written with static configuration data (e.g. permanent configuration data that will be not be changed or rewritten throughout the life of the baggage tag or card) prior to a traveler or passenger's arrival at an airport or transportation facility.

In one or more preferred embodiments, NFC enabled devices, e.g., smartphones and carrier check-in equipment at check points are not used to write data, e.g., configuration data, on NFC baggage tags or cards.

In one or more preferred embodiments, smartphones and carrier check-in equipment at check points are not used to write data, e.g., configuration data, on NFC baggage tags or cards at the time passengers check-in their luggage.

In one or more preferred embodiments, NFC enabled devices have the ability to read stored information in a baggage card or tag.

In one or more preferred embodiments, NFC enabled devices have the ability to read stored static, permanent data encoded on an NFC chip of a baggage tag or card and to allow that data to deliver an executable command and drive the origination of a transaction event on the mobile NFC enabled device.

In one or more preferred embodiments, a baggage tag or card maintains a permanent encode string that is not rewritten or altered at various check points of a baggage tracking system.

In one or more preferred embodiments, it is not necessary to decrypt the content of the NFC tags at a destination facility, terminal or port.

In one or more preferred embodiments, it is not necessary to provide a key to different facilities so that they can read and write to a baggage tag or card at various check-in points throughout a bag's journey because the baggage tracking system is carrier based and because static data is encoded on the baggage tag or card.

In one or more preferred embodiments, a passenger has the ability to use their own NFC enabled device to read the encoding on the NFC chip of the baggage tag or card.

In one or more preferred embodiments, a baggage tracking system and method uses NFC (HF technology) to provide a link to a mobile smart device with NFC technology, while RFID (UHF technology) is used to interface with a transport carrier's baggage system.

In one or more preferred embodiments, a baggage tag or card that can be used in the system and the method is not a single use card or tag.

In one or more preferred embodiments, a baggage tag or card that can be used in the system and the method is a multiple use card or tag.

In one or more preferred embodiments, a baggage tag or card that can be used in the system and the method is a permanent card or tag that can be used for multiple trips.

In one or more preferred embodiments, passenger identifying details are not encoded on an NFC chip embedded within a baggage tag or card. Instead, NFC encoding of a baggage tag or card has a payload that consists of an executable string to direct an NFC enabled device to open an app or website, and then when in the app or website to provide the baggage tag's or card's permanent, static identifier in a way that can be associated with a passenger's itinerary as managed by the transport carrier.

In one or more preferred embodiments, a baggage tracking system and method associates a permanent baggage tag or card with a mobile app and the carrier's passenger record/itinerary and the carrier's baggage tracking system.

In one or more preferred embodiments, an executable code of a baggage card or tag is used to initiate a transaction.

In one or more preferred embodiments, passenger specific details may or may not be encoded on a baggage card or tag.

In one or more preferred embodiments, passenger specific detail is maintained by a transport carrier's central baggage system (which can include a central server, e.g., a secure central server, that stores the passenger specific detail) and is for tracking throughout the journey, not just at the baggage reclaim area, and the passenger specific details may or may not also be encoded on a baggage card or tag.

In one or more preferred embodiments, the baggage tracking system and method helps speed up the process of checking in a bag prior to, or at the start of the journey.

In one or more preferred embodiments, a baggage tracking system and method can be used to speed up the security verification of bag ownership for bags being claimed by its owner upon arrival at a baggage claim area.

In one or more preferred embodiments, the baggage tracking system and method helps speed up the process of checking in a bag prior to, or at the start of the journey, and can help speed up verification of claiming a bag by an appropriate bag owner at a destination airport.

In one or more preferred embodiments, the baggage tracking system and method allows for a reduction of labor and improved efficiency of a bag check process at the beginning of the journey.

In one or more preferred embodiments, the baggage tracking system and method allows for a reduction of labor and improved efficiency of a bag check process at the end of the journey.

In one or more preferred embodiments, the baggage tracking system and method allows for a reduction of labor and improved efficiency of a bag check process at the beginning of the journey and at the end of the journey.

In one or more preferred embodiments, a baggage tracking system and method uses a static identifier associated with each baggage tag or card and more than one baggage tag or card can be associated with a passenger's itinerary or ticket reservation so that more than one bag can be linked to the passenger's itinerary or ticket reservation throughout a journey.

In one or more preferred embodiments of a baggage tag or card, an association is made between identifiers of two separate and distinct radio frequencies of two distinct chips, e.g., an NFC radio frequency of an NFC chip and an RFID radio frequency of an RFID chip, at the time a baggage card/tag is produced and a conversion to a compatible format for both frequencies is done by a computer controller on the encode system that is separate and distinct from either radio frequency of either chip.

In one or more preferred embodiments, an association is made between identifiers of two separate and distinct radio frequencies of two distinct chips, e.g., an NFC radio frequency of an NFC chip and an RFID radio frequency of an RFID chip, at the time a baggage card/tag is produced and a conversion to a compatible format for both frequencies is done by a computer controller on the encode system that is separate and distinct from either radio frequency of either chip, and a static data field is available for each frequency, and each interaction by a field device is read only and only to the assigned frequency of the device initiating communication with the tag.

In one or more preferred embodiments, the system and method does not require, or does not allow, a rewrite of an NFC chip or RFID chip in a baggage tag or card by a field device that interacts with the baggage tag or card in either frequency range.

In one or more preferred embodiments, the system and method include transmitting a static data field in each assigned NFC and RFID frequency and does not include processing functionality within either of the NFC and RFID chips.

In one or more preferred embodiments both a baggage tag/card and a reader (e.g., a mobile phone or tablet) are portable and not stationary.

In one or more preferred embodiments, the system and method include a baggage tag/card and a passenger's reader (e.g., a mobile phone or mobile tablet) that are both portable, and carrier baggage tracking system readers some of which can be stationary and some of which can be portable.

In one or more preferred embodiments, a baggage tag/card and passenger's reader are portable and not stationary, and wherein a carrier's reader can be a stationary reader, e.g., a stationary reader mounted over a belt wherein the movable RFID/NFC baggage cards or tags on the bags pass through the field of one or more stationary interfaces as the bags travel through the baggage system.

In one or more preferred embodiments, NFC data is read by an NFC enabled device to establish a link between a baggage tag or card on a passenger's baggage and the passenger's travel itinerary.

In one or more preferred embodiments, NFC data is read by an NFC enabled device to establish a link between a baggage tag or card on a passenger's baggage and the passenger's travel itinerary and wherein, the system and method communicates a registration of an element from the baggage tag or card to a host website.

In one or more preferred embodiments, a baggage card or tag is a passive card or tag.

In one more preferred embodiments, NFC technology of a phone is not used to push travel itinerary level detail to a baggage tag or card. Instead, one or more preferred embodiments of the system and method read a permanent encode value on a baggage tag or card to initiate a link between the baggage tag or card and a travel itinerary.

In one or more preferred embodiments, a baggage tag or card has a permanent barcode that cannot be dynamically changed at one or more stages of a tracking system.

In one or more preferred embodiments, a baggage tag or card has a permanent encode string and/or permanent barcode that is not changed or reprogrammed for a different trip.

In one or more preferred embodiments, a baggage tag or card has both NFC technology and RFID technology in a single tag or card enabling a simplified and cleaner tracking system and process than prior art systems and processes.

In one or more preferred embodiments, a baggage tag or card includes a static barcode.

In one or more preferred embodiments, a baggage tag or card includes a static barcode and not a dynamic barcode.

In one or more preferred embodiments of the system and method, Bluetooth technology can be used in combination with NFC and RFID technology.

In one or more preferred embodiments, the system and method are used in conjunction with a transport carrier's RFID reader network in the carrier's baggage handling system.

In one or more preferred embodiments, the system and method rely on a carrier's RFID reader network in the carrier's baggage handling system.

In one or more preferred embodiments, the system and method use two distinct antennas/circuits with separate and distinct chips for each frequency (HF/UHF).

In one or more preferred embodiments, both an NFC enabled device (e.g., phone/tablet) and a baggage card/tag are mobile or portable.

In one or more preferred embodiments, the system and method include a fully passive baggage tag or card that is not battery powered.

In one or more embodiments, a baggage tracking method includes the following steps:

a) an NFC enabled device reads an NFC chip in a baggage tag and opens a private website and upon landing at the website, a tag number and tag identification number of the UHF chip are uploaded to the transport carrier's website to check-in the bag to the transport carrier's bag tracking system;

b) tag data linking the tag to the passenger is conveyed over the air through a mobile data network to the transport carrier's bag tracking system;

c) the tag is attached to a bag to be tracked prior to the passenger conveying the bag to a transport operator;

d) the bag that is already checked-in can use a transport carrier's expedited bag drop option to deliver the bag to the transport carrier's bag tracking system;

e) the transport carrier, through the transport carrier's bag tracking system, monitors progress of the bag during the course of the passenger's itinerary from the departing transport facility, to the transportation (e.g., the airplane, bus, train, cruise, ferry), to the destination transport facility;

f) the passenger uses mobile or wifi connection and the NFC enable device to check status of a checked bag until it is retrieved at baggage claim in their destination city.

In various embodiments, the transport carrier inputs and updates bag status information during step e) to the website.

When a passenger visits the website, e.g., from a smart device in step f), the passenger can view the status information inputted by the transport carrier.

In some embodiments, the card/tag that can be used in various embodiments of the method and system as described herein uses a single chip that can function in both HF and UHF frequency ranges and uses a single antenna designed with said functionality as may currently be available or is to be developed in the future. The single antenna can be tuned to operate in desired HF frequency ranges and in desired UF frequency ranges.

In general, a UHF frequency band can cover a range from 300 MHz to 3 GHz. The full UHF spectrum is 300 MHz to 3000 MHz, and systems complying with UHF Gen (Generation) 2 standard for RFID currently use an 860 to 960 MHz band. As systems begin using other generation standards, specific frequencies can be selected based on the system's frequency capability. As other areas of the spectrum become available, future embodiments of the system, method and apparatus of the present invention can potentially use any such other areas of the spectrum as may desired.

In one or more embodiments, the face of a baggage card or tag may be blank, have carrier specific branding printed on it, or tag identifying information (number, bar-code, passenger name, frequent traveler number, etc.) that is a full or partial representation of the data shown on the other side of the tag.

In one or more embodiments, the back of a baggage card or tag may be blank, have carrier specific branding printed on it, or tag identifying information (number, bar-code, passenger name, frequent traveler number, etc.) that is a full or partial representation of the data shown on the other side of the tag.

In one or more embodiments an NFC chip's NDEF encode string may include one or more identifying elements in the payload it delivers upon opening of a specified device application or dedicated website. In addition to the executable string, the NDEF encode payload may include fixed identification data such as, the UHF chip's tag identification number, a serial number assigned to the tag or card that is encoded into the UHF chip's EPC memory, the passenger's frequent traveler number, government issued passenger security clearance number, passenger specific biometric marker(s), or other identifying element encoded into the memory of the NFC chip. The delivery of the unique identifying information from the card's HF chip allows the website or device application to associate the tag's UHF chip with the passenger's itinerary by linking it with a ticket number, reservation number, frequent traveler number, or other identification element that is unique to the specific passenger for whom the tag or card is associated. Once the card's NFC is used to link the tag or card to the reservation, the bag can be tracked through the transport carrier's reservation system or a specific baggage handling system using the card's embedded UHF RFID capability. The carrier is then able to communicate the status of the bag to the passenger by allowing the passenger to query the status of the bag or receive push notifications of bag status directly from their baggage management and tracking system, or through data passed to the carrier's reservation system. The status updates would be available to the passenger through updates to their mobile app or by text and/or e-mail based on the communication preferences established with the passenger.

In one or more embodiments an NFC chip's NDEF encode string may include one or more identifying elements in the payload it delivers upon opening of a specified device application or dedicated website. In addition to the executable string, the NDEF encode payload may include fixed identification data such as, a machine readable element's identification number, a serial number assigned to the tag or bag that is included in data of the machine readable element, the passenger's frequent traveler number, government issued passenger security clearance number, passenger specific biometric marker(s), or other identifying element encoded into the memory of the NFC chip. The delivery of the unique identifying information from the card's HF chip allows the website or device application to associate the tag's or card's machine readable element with the passenger's itinerary by linking it with a ticket number, reservation number, frequent traveler number, or other identification element that is unique to the specific passenger for whom the tag or card is associated. Once the card's NFC is used to link the tag or card to the reservation, the bag can be tracked through the transport carrier's reservation system or a specific baggage handling system using the card's embedded UHF RFID capability. The carrier is then able to communicate the status of the bag to the passenger by allowing the passenger to query the status of the bag or receive push notifications of bag status directly from their baggage management and tracking system, or through data passed to the carrier's reservation system. The status updates would be available to the passenger through updates to their mobile app or by text and/or e-mail based on the communication preferences established with the passenger.

In one or more embodiments, the delivery of information from the encode string opens/accesses a traveler account on the transport carrier website/app, wherein the account information is stored in a carrier's server, for example, and the account info includes data (e.g. the tag identification number) to link to a baggage tag or card, the ticket reservation information, a traveler member number, frequent traveler number, and/or biometric markers.

In one or more embodiments, the NDEF data string from the NFC chip contains an executable that directs the device to open an app or the device's internet browser (google, safari, etc.). Then within the payload it contains identification elements specific to the tag and that allows for automatic association (through the app if the traveler is logged in) or through the internet landing page where it may prompt for passenger specific information that aids in the carrier's system linking the baggage tag to the passenger and their travel itinerary.

In one or more embodiments, the card can be linked to a closest in time travel reservation that is associated with the account (e.g., to the extent the traveler may have multiple tickets booked in advance. This is logic that could be incorporated into the carrier app or website. A passenger/card holder can also be prompted to select a particular itinerary/ticket/ticket reservation to associate with the tag or tag and have them manually select the reservation. Then this information can be conveyed from the traveler account to the transport carrier baggage transport system that a link has been established between a bag and the specific travel reservation. A following confirmation, e.g., of check-in completed, can be sent to the app on the passenger's device, and/or by text/email to the passenger based on contact information kept on file with the carrier.

In one or more embodiments, delivery of information from the NDEF encode string, e.g., an executable in the NDEF encode string, can directly open the transport carrier baggage tracking system on the website or app (rather than first opening a traveler account), wherein the baggage tracking system includes the travel reservation/itinerary (which includes data, e.g., a tag identification number, for linking to a baggage card or tag) stored in a carrier server, and cause a link of the baggage card to the travel reservation/itinerary of the particular traveler in the baggage tracking system to complete check-in. The traveler reservation and itinerary in this embodiment can be the root database element that the bag would be associated with in the same way a frequent traveler number or specific dietary restriction can be linked to the passenger through a specific itinerary. A frequent traveler account may help by storing preferences, but would not automatically assume the same tag would be used for each trip as a traveler with a plurality of tags may only need one for a specific trip so the carrier would need to use the scan as a verification of the correct tag or tags to associate with a specific itinerary.

In one or more embodiments, the present invention includes a baggage tracking system having an account including account identifying information, a card or tag coupled to a bag and wherein identification data for the card or tag is linked to the account, the card can include:
  i) a High Frequency (HF) chip preferably affixed to an HF antenna, the HF antenna preferably tuned to operate in a designated HF frequency range in a passive manner such that the HF antenna is not physically connected to a power source;
  ii) an Ultra High Frequency (UHF) Radio-Frequency IDentification (RFID) chip preferably affixed to a UHF antenna preferably tuned to operate in a designated UHF frequency range in a passive manner such that the UHF antenna is preferably not physically connected to a power source;
  wherein the HF chip can be encoded using Near Frequency Communication (NFC) Data Exchange Format (NDEF) with executable code for directing an NFC enabled device to a transport carrier website or software application (app) wherein the code preferably delivers to the website or software application an NFC encode string including the identification data.

The baggage tracking system including an NFC enabled device that is preferably operable to read the HF chip of the card or tag, a transport carrier baggage tracking system that is preferably operable to read the UHF RFID chip of the card or tag and to process and handle the bag to which the card or tag is coupled, the transport carrier website or app storing information on a traveler, including a travel itinerary and bag tracking information, which the traveler can access through the account, and the transport carrier website or app preferably operable to link the account with the transport carrier baggage tracking system.

In one or more embodiments, the NFC enabled device is preferably operable to initiate check-in of the bag with the transport carrier baggage tracking system from a location that is remote from a transport facility at which the bag will be delivered to the transport carrier baggage tracking system by reading the HF chip so that executable data of the HF chip directs the NFC enabled device to the transport carrier website or app and delivers the identification data to the transport carrier website or app and preferably allows the transport carrier website or app to associate the card or tag with the travel itinerary of the traveler and to link the card or tag to the travel itinerary to check-in the bag to which the card or tag is coupled with the transport carrier baggage tracking system.

In one or more embodiments, the transport carrier baggage tracking system preferably uses the UHF RFID chip for processing and handling of the bag from a departing transportation facility, to transport vehicle, to a destination transportation facility and to bag claim by the traveler.

In one or more embodiments, bag status information on the website or app is preferably checked during a trip from the smart device as desired.

In one or more embodiments, information stored on the transport carrier website or app preferably includes a ticket number, a reservation number, a frequent traveler number, a tag member number, and/or other desired identification elements that are unique to the traveler for whom the card or tag is associated.

In one or more embodiments, the code of the HF chip includes a unique serial number assigned to the card or tag that is preferably encoded into Electronic Product Code (EPC) memory of the UHF RFID chip.

In one or more embodiments, the card or tag is preferably made from rigid plastic conforming to ISO 7810 ID-Type 1 form factor specifications that is about 7 mil to 30 mil (180 to 760 microns) thick.

In one or more embodiments, the card or tag is preferably constructed of PVC, PET, styrene, polypropylene, Tyvek®, or other synthetic material that is about 7 mil to 30 mil (180 to 760 microns) thick.

In one or more embodiments, the card or tag is preferably made from paper or other non-synthetic material that is about 4 to 36 mils (100 to 915 microns).

In one or more embodiments, the code preferably includes data for a barcode or human readable number that is unique to the card or tag and also serves to support tracking through the transport carrier baggage tracking system.

In one or more embodiments, the card or tag preferably does not conform to ISO 7810 ID-Type 1 form factor specifications.

In one or more embodiments, the UHF RFID chip preferably has a frequency of about 860 to 960 MHz and is readable from a distance of up to about 20 meters.

In one or more embodiments, the HF chip has a frequency of about 13.56 MHz and is preferably readable from a distance of less than about 1 meter.

In one or more embodiments, the code of the HF chip is preferably permanent and not to be re-written at a checkpoint of the transport carrier baggage tracking system.

In one or more embodiments, the present invention includes a baggage tracking system having an account including account identifying information, a card coupled to a bag and linked to the account.

The card preferably includes:
  i) a High Frequency (HF) chip affixed to a passive HF antenna; and
  ii) a barcode that is permanently assigned to the card;
  wherein the HF chip is preferably encoded using Near Frequency Communication (NFC) Data Exchange Format (NDEF) with executable code for directing an NFC enabled device to a transport carrier website or software application (app) wherein the code delivers in an NFC encode string card identification data that is unique to the card.

In one or more embodiments, the baggage tracking system includes an NFC enabled device that is preferably operable to read the HF Chip of the card.

In one or more embodiments, the baggage tracking system includes a transport carrier baggage tracking system that is preferably operable to read the barcode of the card and to process and handle the bag.

In one or more embodiments, the transport carrier website or app storing information on the account including a travel itinerary and bag status information and is preferably operable to link the account with the transport carrier baggage tracking system.

In one or more embodiments, the NFC enabled device is preferably operable to initiate check-in of the bag with the transport carrier baggage tracking system at a location that is remote from a transport facility where the bag will be delivered to the transport carrier baggage tracking system by reading the HF chip so that executable data of the HF chip directs the NFC enabled device to the transport carrier website or app and delivers the card identification data to the transport carrier website or app and allows the transport carrier website or app to associate the card with the travel itinerary of the account and to link the card to the travel itinerary in the transport carrier baggage tracking system to check-in the bag.

In one or more embodiments, the transport carrier baggage tracking system preferably uses the barcode for processing and handling of the bag from a departing transportation facility, to a transport vehicle, to a destination transportation facility and to bag claim.

In one or more embodiments, the bag status information on the transport carrier website or app during a trip is preferably checked from the smart device as desired.

The present invention includes a baggage tracking system for tracking a bag during a trip having an account, a card coupled to the bag, wherein the card is linked to the account, and wherein the card includes a chip that can function in both HF and UHF frequency ranges, the chip having a connection to a passive HF antenna and a passive UHF antenna, wherein the chip is preferably encoded using Near Frequency Communication (NFC) Data Exchange Format (NDEF) with code for directing an NFC enabled device to a transport carrier website or software application (app) wherein the code delivers in an NFC encode string identification data that is unique to the chip of the card.

The baggage tracking system also includes an NFC enabled device that is preferably operable to read the chip of the card using HF frequency, a transport carrier baggage tracking system that is preferably operable to read the chip of the card using UHF frequency and to process and handle the bag to which the card is coupled, the transport carrier website or app preferably storing information on the account, including a travel itinerary and bag status information and operable to link the account with the transport carrier baggage tracking system.

In one or more embodiments, the NFC enabled device is preferably operable to initiate check-in of the bag with the transport carrier baggage tracking system at a location that is remote from the transport carrier baggage tracking system by reading the chip so that the code of the chip preferably directs the NFC enabled device to the transport carrier website or app and preferably delivers the identification data that is unique to the chip to the transport carrier website or app and preferably allows the transport carrier website or app to associate the card with the travel itinerary of the account and to preferably link the card to the travel itinerary in the transport carrier baggage tracking system to check-in the bag.

In one or more embodiments, the transport carrier baggage tracking system preferably uses UHF capabilities of the card for processing and handling of the bag from a departing transportation facility, to a transport vessel, to a destination transportation facility and to bag claim.

In one or more embodiments, bag status on the website or app is preferably checked from the smart device during a trip as desired.

In one or more embodiments, a baggage tracking system of the present invention includes:
a) an account;
b) a card coupled to a bag and wherein the card is preferably linked to the account, the card including a chip that operates in both HF and UHF frequency ranges, the chip having a connection to an antenna that preferably operates in both HF and UHF frequency ranges, wherein the chip is encoded using Near Frequency Communication (NFC) Data Exchange Format (NDEF) with code including executable data for directing an NFC enabled device to a transport carrier website or software application (app) wherein the code delivers in an NFC encode string identification data that is unique to the chip of the card;
c) an NFC enabled device that is preferably operable to read the chip of the card using HF frequency;
d) a transport carrier baggage tracking system that is preferably operable to read the chip of the card using UHF frequency and to process and handle the bag to which the card is coupled;
e) the transport carrier website or app storing information on the account including a travel itinerary and bag status information, and the transport carrier website or app operable to link the account with the transport carrier baggage tracking system;

wherein the smart device is operable to initiate check-in of the bag with the transport carrier's baggage tracking system by reading the chip so that encoded data of the chip directs the NFC enabled device to the transport carrier website or app and delivers the identification data that is unique to the chip to the transport carrier website or app and allows the transport carrier website or app to associate the card with the travel itinerary of the traveler and to link the card to the travel itinerary in the transport carrier's baggage tracking system to check-in the bag;

wherein the transport carrier's baggage tracking system uses the card's UHF capability for processing and handling of the bag from a departing transportation facility, to a transport vehicle, to a destination transportation facility and to a bag claim area; and wherein bag status information on the transport carrier website or app is checked from the smart device during the trip as desired.

In one or more embodiments, a method of tracking baggage while traveling from a departing destination to an arrival destination can include the following steps:
a) establishing a travel account with account identifying information of an account holder that is preferably linkable to one or more travel itineraries;
b) obtaining a card that is preferably linked to the travel account, the card including:
i) Near Field Communication (NFC) technology that is preferably encoded using NFC Data Exchange Format (NDEF) with code including executable data for directing an NFC enabled device to a transport carrier website or software application (app) wherein encoded data delivers in an NFC encode string identification data that is unique to the card;
ii) machine readable technology that is preferably operable to be read by and used in conjunction with a transport carrier baggage tracking system;
c) coupling the card to the bag;
d) initiating check-in to the transport carrier baggage tracking system by placing the card in proximity of the NFC enabled device at a location that is remote from the transport carrier baggage tracking system so that the NFC enabled device reads the NFC technology of the card and wherein the code of the NFC technology directs the NFC enabled device to the transport carrier website or app and delivers the identification data that is unique to the card to the transport carrier website or app and allows the transport carrier website or app to associate the card with one of the travel itineraries associated with the account and to link the card to the travel itinerary in the transport carrier baggage tracking system to check-in the bag; and e) checking status information of the bag during a trip using the smart device to access the status information on the bag at the transport carrier website or app, wherein the transport carrier website or app stores information on processing and handling of the bag during the trip, wherein the information is received from the transport carrier baggage tracking system's reading of the machine readable technology of the card coupled to the bag.

In one or more embodiments, the NFC technology is preferably an HF chip connected to an HF antenna and the machine readable technology is a UHF chip connected to a UHF antenna.

In one or more embodiments, the NFC technology is preferably an HF chip connected to an HF antenna and the machine readable technology is a barcode.

In one or more embodiments, the NFC technology and the machine readable technology is preferably part of a single chip that can operate in HF and UHF frequency ranges, wherein the single chip is preferably connected to both a UHF antenna and an HF antenna.

In one or more embodiments, the NFC technology and machine readable technology is preferably part of a single chip that can operate in HF and UHF frequency ranges, wherein the single chip is preferably connected to a single antenna that is tuned to desired HF and UHF frequencies.

In one or more embodiments, the UHF chip preferably has a UHF frequency of about 860 to 960 MHz and is preferably readable from a distance of up to about 20 meters and the HF chip preferably has an HF frequency of about 13.56 MHz and can be read from a distance of less than about 1 meter.

In one or more embodiments, the HF chip preferably has an HF frequency of about 13.56 MHz and is readable from a distance of less than about 1 meter.

In one or more embodiments, the single chip preferably has an HF frequency of about 13.56 MHz and is readable from a distance of less than about 1 meter and the chip has a UHF frequency of about 860 to 960 MHz and is readable from a distance of up to about 20 meters.

In one or more embodiments, the chip preferably has an HF frequency of about 13.56 MHz and is readable from a distance of less than about 1 meter, and the chip has a UHF frequency of about 860 to 960 MHz and is readable from a distance of up to about 20 meters.

In one or more embodiments, initiating check-in preferably occurs prior to arrival at a transport facility.

In one or more embodiments, initiating check-in preferably occurs on grounds of a transport facility.

In one or more embodiments, the travel account includes one or more biometric markers that are unique to the account holder and wherein the one or more biometric markers are captured by the NFC enabled device when initiating check-in, and wherein the NDEF encoding data from the HF chip is combined with the one or more biometric markers that are captured by the NFC enabled device, which are transmitted to the transport carrier baggage tracking system, and wherein the one or more biometric markers are used by the transport carrier baggage tracking system for security purposes.

In one or more embodiments, the security purposes include verification of the identity of the account holder with a person dropping the bag at the transport carrier baggage tracking system.

In one or more embodiments, the transport carrier baggage tracking system can use the one or more biometric markers captured by the NFC enabled device to validate that a passenger checking the bag matches the account holder assigned to the travel itinerary.

In one or more embodiments, the transport carrier baggage tracking system captures the one or more biometric markers at an automatic baggage drop machine to validate that the card holder dropping off the bag matches the account holder assigned to the travel itinerary and/or the card holder that checked in the bag.

In one or more embodiments, the one or more biometric markers collected by the NFC enabled device include one or more unique identification features such as fingerprint, voice signature, palm print, hand geometry, facial geometry (facial recognition markers), brain signals (electroencephalogram), heart signals (electrocardiogram), or another unique physiological characteristic.

In one or more embodiments, at least some of the code of the NFC technology is permanent.

In one or more embodiments, the code of the NFC technology is not rewritten or changed at check-points of the transport carrier baggage tracking system.

The present invention includes a method of tracking baggage from a departing destination to an arrival destination during a trip, the method including the following steps:

a) providing a travel account with account identifying information of an account holder that is linkable to one or more travel itineraries and to a transport carrier baggage tracking system;

b) providing a transport carrier website or software application (app) that stores information on and manages the travel account and the transport carrier baggage tracking system;

c) providing a card to the account holder, wherein the card is linked to the travel account and the card includes:
 i) Near Field Communication (NFC) technology that is encoded using NFC Data Exchange Format (NDEF) with code including executable data for directing an NFC enabled device of the account holder to the transport carrier website or app wherein the encoded executable data delivers in an NFC encode string identification data that is unique to the card; and
 ii) machine readable technology that is operable to be read by and used in conjunction with the transport carrier baggage tracking system;

wherein the card is operable to be coupled to a bag of the account holder;

wherein the account holder initiates check-in of the bag to the transport carrier baggage tracking system by placing the card in proximity of the NFC enabled device of the account holder so that the NFC enabled device reads the NFC technology of the card and wherein the code of the NFC technology directs the NFC enabled device to the transport carrier website or app and delivers the identification data that is unique to the card to the transport carrier website or app and allows the transport carrier website or app to associate the card with one of the travel itineraries associated with the travel account and to link the card to the travel itinerary in the transport carrier baggage tracking system to check-in the bag;

d) receiving bag check-in information from the account holder; and e) handling and processing the bag during the trip of the account holder from the departing facility, to the arrival facility, to bag claim by the account holder, wherein handling and processing of the bag includes delivering and updating bag status information during the trip to the transport carrier website or app so that an account holder can view the bag status information on the transport carrier website or app using the NFC device of the account holder.

In one or more embodiments, the NFC technology of the card that is provided is preferably an HF chip connected to an HF antenna and the machine readable technology is a UHF chip connected to a UHF antenna.

In one or more embodiments, the NFC technology of the card that is provided is preferably an HF chip connected to an HF antenna and the machine readable technology is a barcode.

In one or more embodiments, the NFC technology of the card that is provided and the machine readable technology is preferably part of a single chip that can operate in HF and UHF frequency ranges, wherein the single chip is connected to both a UHF antenna and an HF antenna.

In one or more embodiments, the NFC technology of the card that is provided and the machine readable technology is preferably part of a single chip that can operate in HF and UHF frequency ranges, wherein the single chip is connected to a single antenna that is tuned to desired HF and UHF frequencies.

In one or more embodiments, the UHF chip has a UHF frequency of about 860 to 960 MHz and is readable from a distance of up to about 20 meters and the HF chip has an HF frequency of about 13.56 MHz and is readable from a distance of less than about 1 meter.

In one or more embodiments, the HF chip has an HF frequency of about 13.56 MHz and is readable from a distance of less than about 1 meter.

In one or more embodiments, the chip has a UHF frequency of about 860 to 960 MHz and is readable from a distance of up to about 20 meters and the HF chip has an HF frequency of about 13.56 MHz and is readable from a distance of less than about 1 meter, and the chip has a UHF frequency of about 860 to 960 MHz and is readable from a distance of up to about 20 meters.

In one or more embodiments, at least some of the code of the NFC technology is permanent.

In one or more embodiments, the code of the NFC technology is not rewritten or changed at check-points of the transport carrier baggage tracking system.

The present invention includes a baggage tracking card for coupling to a bag during a trip, the card including:

a) Near Field Communication (NFC) technology that is encoded using NFC Data Exchange Format (NDEF) with code for directing an NFC enabled device of a card holder to a transport carrier website or software application (app) wherein the code delivers in an NFC encode string card identification data that is unique to the card; and b) machine readable technology that is operable to be read by and used in conjunction with a transport carrier baggage tracking system;

wherein the card is linked to a travel account of a cardholder established on the transport carrier website or app, and wherein the travel account includes cardholder identifying information and data on one or more travel reservations that are linked to a transport carrier baggage tracking system enabling the cardholder to check-in a bag that has the card coupled thereto with the transport carrier baggage tracking system remotely from the NFC enabled device; and wherein the machine readable technology is operable to be used in conjunction with and to be read by a transport carrier's baggage tracking system.

In one or more embodiments, the NFC technology of the card that is provided is preferably an HF chip connected to an HF antenna and the machine readable technology is a UHF chip connected to a UHF antenna.

In one or more embodiments, the NFC technology of the card that is provided is preferably an HF chip connected to an HF antenna and the machine readable technology is a barcode.

In one or more embodiments, the NFC technology and the machine readable technology of the card is preferably as part of a single chip that operates in HF and UHF frequency ranges, wherein the single chip is connected to both a UHF antenna and an HF antenna.

In one or more embodiments, the NFC technology and the machine readable technology of the card is preferably part of a single chip that operates in HF and UHF frequency ranges, wherein the single chip is connected to a single antenna that is tuned to desired HF and UHF frequencies.

In one or more embodiments, the UHF chip has a UHF frequency of about 860 to 960 MHz and is readable from a distance of up to about 12 meters and the HF chip has an HF frequency of about 13.56 MHz and is readable from a distance of less than about 1 meter.

In one or more embodiments, the HF chip has an HF frequency of about 13.56 MHz and is readable from a distance of less than about 1 meter.

In one or more embodiments, the chip has a UHF frequency of about 860 to 960 MHz and is readable from a distance of up to about 12 meters and the chip has an HF frequency of about 13.56 MHz and is readable from a distance of less than about 1 meter.

In one or more embodiments, the chip has a UHF frequency of about 860 to 960 MHz and is readable from a distance of up to 12 meters and the chip has an HF frequency of about 13.56 MHz and is readable from a distance of less than 1 meter.

In one or more embodiments, the card is used for more than one trip.

In one or more embodiments, the card is used for multiple trips and has a lifetime of 1 to 10 years.

In one or more embodiments, the NDEF encoding data from the card's HF chip is combinable with one or more biometric markers capturable by the NFC enabled device and which is transmitted to the transport carrier, and wherein the biometric marker or markers transmitted is used by the transport carrier for security purposes.

In one or more embodiments, the one or more biometric markers include one or more unique identification features such as fingerprint, voice signature, palm print, hand geometry, facial geometry (facial recognition markers), brain signals (electroencephalogram), heart signals (electrocardiogram), or another unique physiological characteristic.

In one or more embodiments, the present invention includes a baggage tracking system including:

a) an account including account identifying information;

b) the card;

c) the NFC enabled device that is operable to read the NFC technology of the card;

d) the transport carrier baggage tracking system that is operable to read the machine readable technology of the card and to process and handle the bag to which the card is coupled;

e) the transport carrier website or app storing information on the travel account and the cardholder including information on one or more biometric markers, the one or more travel reservations and baggage tracking information, which the cardholder can access through the travel account, and the transport carrier website or app operable to link the travel account with the transport carrier baggage tracking system;

wherein the NFC enabled device is operable to initiate check-in of the bag with the transport carrier baggage tracking system by reading the NFC technology of the card so that the encoded data of the NFC technology directs the NFC enabled device to the transport carrier website or app and delivers the card identification data to the transport carrier website or app and allows the transport carrier website or app to associate the card with one of the travel reservations of the cardholder and to link the card to said travel reservation to check-in the bag to which the card is coupled with the transport carrier baggage tracking system;

wherein the transport carrier baggage tracking system uses the machine readable technology of the card for processing and handling of the bag from a departing transportation facility, to a transport vehicle, to a destination transportation facility and to bag claim by the traveler; and wherein the baggage status information on the website or app is checked during the trip from the smart device as desired.

In one or more embodiments, the code of the NFC technology including the card identification data is preferably generated in advance and permanently encoded in the card prior to receipt by the cardholder who has the card prior to arrival at the departing transportation facility.

In one or more embodiments, the transport carrier assigns the card identification data to the card and associates the card identification data with the cardholder instead of the card identification data being assigned at the departing transportation facility.

In one or more embodiments, the card is used for more than one trip and wherein the system does not require the writing of data to the NFC technology in the card for each trip given that the card identification data is permanently encoded at a time the card is made and remains permanently in the NFC technology and is not erased and rewritten for each said trip.

In one or more embodiments, the NFC enabled device has the ability to read the code including the card identification data that is permanently stored in the NFC technology and to allow that code to deliver an executable command and drive the origination of a check-in transaction event on the NFC enabled device.

In one or more embodiments, a method of tracking baggage from a departing destination to an arrival destination during a trip can include the following steps:

a) providing the travel account with account identifying information of the cardholder that is linkable to the one or more travel reservations and to the transport carrier baggage tracking system;

b) providing the transport carrier website or app that stores information on, and manages the travel account and the transport carrier baggage tracking system;

c) providing the card to the cardholder, wherein the card is linked to the travel account;

d) receiving bag check-in information from the cardholder linking the card one of the travel reservations;

e) handling and processing the bag during the trip of the cardholder from the departing destination, to the arrival destination, to bag claim by the cardholder, wherein handling and processing of the bag includes delivering and updating bag status information during the trip to the transport carrier website or app so that the cardholder can view the bag status information on the transport carrier website or app using the NFC device of the cardholder.

In one or more embodiments, the transport carrier generates of the executable data including an encoded data set the NFC technology, including the card identification data at the time the card is made and the encoded data set is permanently encoded in the card prior to receipt by the cardholder who has the card prior to arrival at the departing destination.

In one or more embodiments, the transport carrier assigns the card identification data to the card and associates the card identification data with the cardholder, instead of the card identification data being assigned at the departing destination.

In one or more embodiments, the card is preferably used for more than one trip and wherein the method does not require writing of data to the NFC technology in the card for each said trip given that the card identification data is permanently encoded at a time the card is made and remains permanently in the NFC technology and is not erased and rewritten for each said trip.

The present invention includes a baggage tracking card or tag for coupling to a bag during a trip, the card or tag including:

a) Near Field Communication (NFC) technology that is encoded using NFC Data Exchange Format (NDEF) with code including executable data for directing an NFC enabled device of a card holder to a transport carrier baggage tracking system wherein the executable data delivers in an NFC encode string card identification data that is unique to the card;

b) machine readable technology that is operable to be read by and used in conjunction with a transport carrier baggage tracking system; and c) a remote check-in function wherein the card or tag is operable to initiate and cause check in of the bag to the transport carrier baggage tracking system prior to embarking on the trip, wherein the card or tag is linked to a card holder in a transport carrier baggage tracking system and wherein delivery of the executable data to the transport carrier baggage tracking system causes a link between the card or tag and a travel reservation of the card holder to check-in the bag with the card or tag coupled thereto for the trip; and wherein the machine readable technology is operable to be used in conjunction with and to be read by a transport carrier's baggage tracking system.

The present invention includes a baggage tracking system comprising:

a) the card or tag;

b) the NFC enabled device that is operable to read the NFC technology of the card;

c) the transport carrier baggage tracking system that is operable to read the machine readable technology of the card or tag and to process and handle the bag to which the card or tag is coupled;

d) a transport carrier website or app storing information on the travel account and the card holder including information on one or more biometric markers of the card holder, the travel reservations and baggage tracking information, which the card holder can access through the transport carrier website or app.

The present invention includes a method of tracking baggage from a departing destination to an arrival destination during a trip, the method including the following steps:
 a) providing a transport carrier website or app that stores information on and manages the transport carrier baggage tracking system;
 b) providing the card or tag to the card holder, wherein the card or tag is linked to the card holder in the transport carrier baggage tracking system;
 d) receiving bag check-in information from the card holder and linking the card or tag to the travel reservation; and
 e) handling and processing the bag during the trip of the card holder from a departing destination, to an arrival destination, to bag claim by the card holder, wherein handling and processing of the bag includes delivering and updating bag status information during the trip to the transport carrier website or app so that the card holder can view the bag status information on the transport carrier website or app using the NFC device of the cardholder.

A method of the present invention includes transporting luggage from a departing locale to an arriving locale comprising the steps of:
 a) establishing an account for a traveler with a carrier that includes contact information of the traveler;
 b) booking an itinerary with the carrier that is linked to the account established in step "a";
 c) obtaining a card or tag that includes identification data that is linked to the account established in step "a" prior to initiating a check-in event and wherein the card or tag includes:
  (i) Near Field Communication (NFC) technology that is encoded using NFC Data Exchange Format (NDEF) with permanent code including executable data for directing an NFC enabled device to open a website or software application (app) of the carrier on the NFC enabled device, wherein the executable data delivers in an NFC encode string the identification data that is unique to the card or tag and linkable to the account, and wherein the executable data is configured to capture biometric data of the traveler that is captured in real-time by the NFC enabled device; and
  (ii) machine readable technology that is operable to be read by and used in conjunction with a baggage tracking system of the carrier;
  (iii) wherein the executable data read by the NFC enabled device launches the website or software app of the carrier on the NFC enabled device, and
  (iv) wherein the NFC enabled device delivers the identification data of the card or tag along with any biometric data captured by the executable data to the website or app of the carrier that links the card or tag to the account of step "a" and to the itinerary of step "b" so that the carrier can track the luggage item associated with the itinerary and verify identity of the traveler;
 d) coupling the card or tag to a luggage item of the traveler;
 e) causing check-in of the luggage item with the card or tag attached thereto with the carrier in a single step of the traveler placing the NFC enabled device in proximity of the card or tag so that the NFC enabled device reads the executable code of the card or tag of step "c" and delivers it the website or app where a link is automatically established between the card or tag and the itinerary;
 f) using the NFC enabled device to also capture live biometric markers of the traveler that are captured by the executable code during step "e" at the time of check-in and delivered to the website or app where the live biometric markers are compared to stored biometric markers in the account to verify identity of the traveler; and
 g) dropping the luggage item with the card or tag attached thereto at a designated luggage drop of the carrier; and
 wherein steps "e" through "g" are performed without a traveler having to:
  (i) open the website or app of the carrier or input information;
  (ii) stop or input data at a kiosk at the departing locale;
  (iii) speak with a counter representative; and
  (iv) write or input information or data to the card or tag.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 3A is a front view of a first preferred embodiment of a baggage tag or card that can be used in the system and/or method of FIG. 1 or 2;

FIG. 3B is a side view of a first preferred embodiment of a baggage tag or card that can be used in the system and/or method of FIG. 1 or 2;

FIG. 3C is a back view of a first preferred embodiment of a baggage tag or card that can be used in the system and/or method of FIG. 1 or 2;

FIG. 3D is an exploded view of a first preferred embodiment of a baggage tag or card that can be used in the system and/or method of FIG. 1 or 2;

FIG. 4A is a front view of a second preferred embodiment of a baggage tag or card that can be used in the system and/or method of FIG. 1 or 2;

FIG. 4B is a side view of a second preferred embodiment of a baggage tag or card that can be used in the system and method of FIG. 1 or 2;

FIG. 4C is a back view of a second preferred embodiment of a baggage tag or card that can be used in the system and/or method of FIG. 1 or 2;

FIG. 4D is an exploded view of a second preferred embodiment of a baggage tag or card that can be used in the system and/or method of FIG. 1 or 2;

FIG. 5A is a front view of a third preferred embodiment of a baggage tag or card that can be used in the system and method of FIG. 1 or 2;

FIG. 5B is a side view of a third preferred embodiment of a baggage tag or card that can be used in the system and/or method of FIG. 1 or 2;

FIG. 5C is a back view of a third preferred embodiment of a baggage tag or card that can be used in the system and/or method of FIG. 1 or 2;

FIG. 5D is an exploded view of a third preferred embodiment of a baggage tag or card that can be used in the system and/or method of FIG. 1 or 2;

FIG. 6A is a front view of a fourth preferred embodiment of a baggage tag or card that can be used in the system and/or method of FIG. 1 or 2;

FIG. 6B is a side view of a fourth preferred embodiment of a baggage tag or card that can be used in the system and/or method of FIG. 1 or 2;

FIG. 6C is a back view of a fourth preferred embodiment of a baggage tag or card that can be used in the system and/or method of FIG. 1 or 2; and FIG. 6D is an exploded view of a fourth preferred embodiment of a baggage tag or card that can be used in the system and/or method of FIG. 1 or 2.

DETAILED DESCRIPTION OF THE INVENTION

Figure 1:
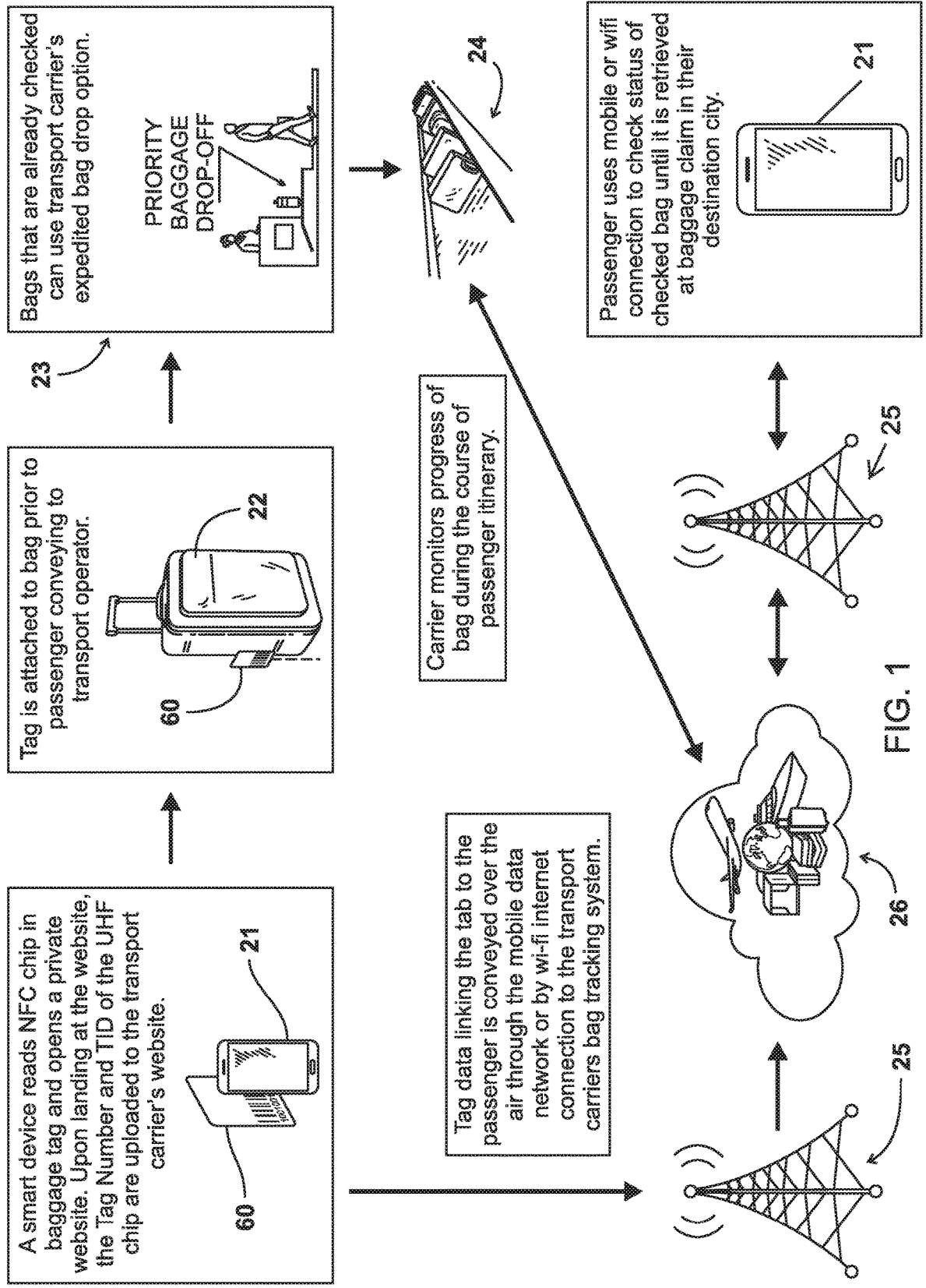
FIG. 1 is a schematic diagram illustrating a first preferred embodiment of the system and method of the present invention.
Figure 2:
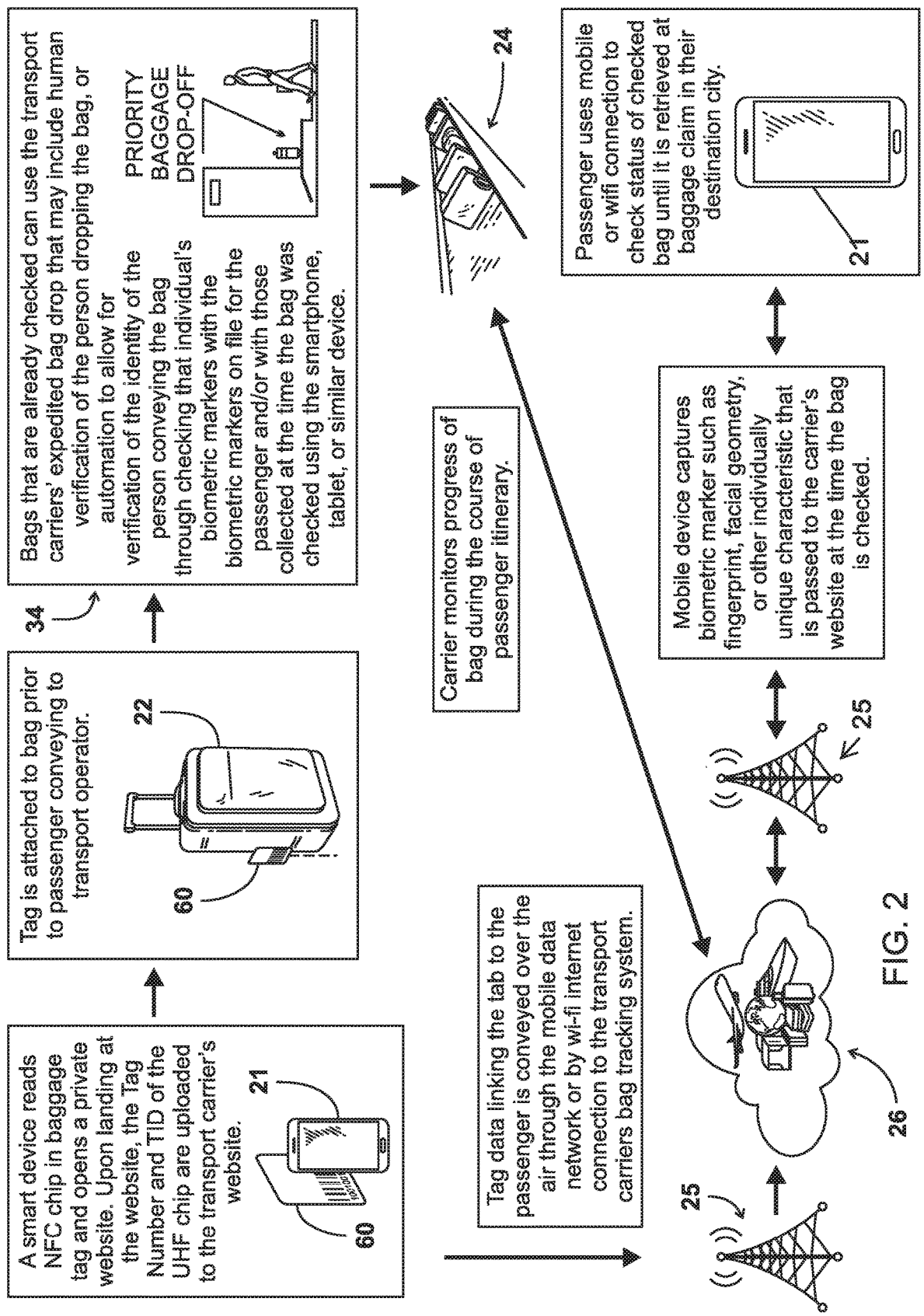
FIG. 2 is a schematic diagram illustrating a second preferred embodiment of the system and method of the present invention.

FIG. 1 illustrates a first preferred embodiment of a method and system of the present invention. FIG. 2 illustrates a second preferred embodiment of a method and system of the present invention. FIGS. 3A-3D illustrate a first preferred embodiment of a baggage tag or card that can be used in the method and system as shown in FIG. 1 or FIG. 2. FIGS. 4A-4D illustrate a second preferred embodiment of a baggage tag or card that can be used in the method and system as shown in FIG. 1 or 2. FIGS. 5A-5D illustrate a third preferred embodiment of a baggage tag or card that can be used in the method and system as shown in FIG. 1 or FIG. 2. FIGS. 6A-6D illustrate a fourth preferred embodiment of a baggage tag or card that can be used in the method and system as shown in FIG. 1 or FIG. 2. In FIGS. 3A-3D a first preferred embodiment of a baggage tag or card, designated by the numeral 10, is illustrated. Preferably, tag or card 10 is made from rigid plastic conforming to ISO 7810 ID-Type 1 form factor specifications (or to other similar standards or systems currently available or to be developed in the future) and is about 7 mils to 30 mils thick (180 to 760 microns). Tag or card 10 can be constructed of PVC, PET, styrene, polypropylene, Tyvek®, or other desired synthetic material that is 7 mil to 30 mil thick (180 to 760 microns). Card/tag 10 can include an opening 17 so that a tie or other coupler can be threaded through opening 17 and used to attach card/tag 10 to bag 22. A card/tag 10 can also be coupled to a bag 22 in other suitable manners as are known in the art. Card/tag 10 can include a passenger/traveler name 19 and a tag member number or tag member identifier 20 that can be encoded in the UHF chip 13 and which can also be imaged on a front 28 or back 29 surface of a card/tag 10 as desired, using inkjet, thermal transfer, laser, or other commercially available variable imaging process or other similar process to be developed in the future. A tag/card 10 also preferably includes a tag identification number 18 that is preferably encoded in UHF chip 13 and which can be imaged on a front 28 or back 29 surface of a card/tag 10 as desired. In one or more embodiments a tag identification number 18 and/or tag member number or identifier 20 is included in both human readable and barcode formats.

A front 28 of a tag or card 10 can be blank. A front 28 can also have carrier specific branding printed on it, or tag identifying information (e.g., number 18, bar-code 15/16, passenger name 19, a frequent traveler number which can be a number 20, etc.) that can be a full or partial representation of the data shown on the other side of the tag. Likewise, a back 29 of a tag or card 10 can be blank. A back 29 can also have carrier specific branding printed on it, or tag identifying information (e.g., number 18, bar-code 15/16, passenger name 19, a frequent traveler number which can be a number 20, etc.) that can be a full or partial representation of the data shown on the other side of the tag or card 10.

A tag or card 10 front 28 and/or back 29 can be opaque or transparent or semi-transparent. The antenna(s) and chip (s) inside a card or tag 10 often cannot be seen.

Card 10 preferably is equipped with both Near Field Communication technology and Radio Frequency IDentification (RFID) technology. Card 10 as shown in FIGS. 3A-3D has both an embedded Near field Communication NFC chip (e.g., a High Frequency (HF) chip 11, which can be an HF Radio Frequency IDentification (RFID) chip), and an Ultra High Frequency (UHF) chip 13, which preferably is a UHF Radio Frequency IDentification (RFID) chip. Other suitable NFC chips or technology, HF chips or technology, UHF chips or technology, and RFID chips or technology that are currently available or to be developed in the future that will enable a card 10 to function and be used in the manner as shown and described herein also can be used in one or more embodiments of a card 10.

HF chip 11 preferably is affixed to its own HF antenna 12 that is appropriately tuned to operate in its designated frequency range in a passive manner such that the HF antenna 12 is not physically connected to a power source such as a battery. UHF chip 13 is preferably affixed to its own UHF unique antenna 14 that is appropriately tuned to operate in its designated frequency range in a passive manner such that UHF antenna 14 is not physically connected to a power source such as a battery.

In one or more preferred embodiments, HF chip 11 is preferably encoded using NFC Data Exchange Format (NDEF) with NFC NDEF executable code that includes chip 11 identifying information, e.g., tag identification number 18, that can direct a smart device 21 that is NFC enabled, e.g., a smartphone, tablet, or other NFC enabled device, to a dedicated website or app where the code initializes the bag check-in interaction by delivering in the NFC NDEF executable encode string identification data that is unique to card's/tag's 10 UHF chip 13.

In one or more preferred embodiments, HF chip 11 is preferably encoded using NFC Data Exchange Format (NDEF) with code that can direct a smart device 21 that is NFC enabled, e.g., a smartphone, tablet, or other NFC enabled device, to a dedicated website or app where the code initializes the bag check-in interaction by delivering in the NFC NDEF executable encode string identification data that is unique to card's/tag's 10 UHF chip 13. The NFC encode string preferably includes such data as the UHF chip 13's tag identification number 18, which can be a serial number, or other unique identifier, assigned to the tag that is encoded into the UHF chip's 13 Electronic Product Code (EPC) memory. The NFC encode string can also include the tag member number or tag member identifier 20. The delivery of the unique identifying information from the card's/tag's 10 UHF chip 13 preferably allows the website or app to associate the tag/card 10 with an account and travel itinerary of the passenger/traveler by associating the tag identification number 18 and therefore the card/tag 10, with a ticket number, reservation number, frequent traveler number, or other identification element that is unique to the specific passenger for whom the tag/card 10 is associated. The tag identification number 18 can be included in a data server maintained by the carrier for the associating/linking with the travel itinerary or ticket reservation and/or in data associated with the traveler's account to provide a link between the tag/card 10 and the travel itinerary or ticket reservation.

If a traveler's/passenger's account includes other family members, for example, or more than one pending travel itinerary, the traveler/passenger can designate to which person and which itinerary that the tag/card 10 is to be linked by navigating through appropriate instructions and prompts on the transport carrier's website/app.

Once the card's HF chip 11 is used to link the tag/card 10 to the travel itinerary or tick reservation, the bag 22 can preferably be tracked through the transport carrier's baggage handling system using the card's embedded UHF RFID capability.

If a tag or card 10 includes a barcode, e.g., a Quick Response (QR) code including a vertical barcode 15 and horizontal barcode 16 as shown in FIG. 3C, preferably, the NDEF encode string of HF chip 11 includes data for the barcodes 15/16. A QR code scanner or reader can read the barcodes 15/16. A QR code reader app can be downloaded to a smart device 21. Human readable numbers 18 (tag identification number), and 19 (tag member number) can also be included in the NDEF encode string of HF chip 11. Preferably, such a barcode 15/16 is unique to the specific card/tag 10 and also serves to support tracking through a baggage tracking system of the carrier. Preferably, tag identification number 18 is also unique to the specific card/tag 10 and also serves to support tracking through a baggage tracking system of the carrier. Tag member number 20 can also be unique to the specific card/tag 10 and also serves to support tracking through a baggage tracking system of the carrier, although in some embodiments the same tag member number 20 can be included on more than one baggage tag owned by the same traveler. Additionally, in one or more preferred embodiments, more than one tag can be associated with a passenger or traveler itinerary.

In some embodiments, the card does not have an embedded UHF chip but is tracked using the transport carrier's baggage tracking system solely by a barcode 15, 16 that is permanently assigned to that specific card/tag 10.

FIGS. 4A-4D depict another preferred embodiment of card/tag, designated by the numeral 30, that can be used in the method and/or system as depicted in FIG. 1 or 2. Card or tag 30 preferably is equipped with both NFC technology and RFID technology. Card or tag 30 as shown in FIGS. 4A-4D includes a HF/UHF combination chip 31 that has both NFC technology and RFID technology. Card/tag 30 is similar to card/tag 10 except that card/tag 30 uses a single NFC HF/UHF combination chip 31 that can function in both HF and UHF frequency ranges, with connection to an antenna specific to each frequency. Card or tag 30 can function in a similar manner as discussed with regard to card 10.

As shown, HF/UHF combination chip 31 is connected to UHF antenna 32 and HF antenna 33. Preferably a chip 31 has UHF RFID capabilities. Other suitable NFC chips or technology, HF chips or technology, UHF chips or technology, and RFID chips or technology that are currently available or to be developed in the future that will enable a card 30 to function and be used in the manner as shown and described herein also can be used in one or more embodiments of a card 30.

Like card/tag 10, card/tag 30 preferably is made from rigid plastic conforming to ISO 7810 ID-Type 1 form factor specifications and is about 7 mil to 30 mil thick (180 to 760 microns). Tag or card 30 can be constructed of PVC, PET, styrene, polypropylene, Tyvek®, or other desired synthetic material that is about 7 mil to 30 mil thick (180 to 760 microns). In some embodiments card/tag 30 can include an opening 17 so that a tie or other coupler can be threaded through opening 17 and used to attach card/tag 30 to a bag 22. A card/tag 30 can also be coupled to a bag 22 in other manners as are known in the art. Card/tag 30 can include a passenger/traveler name 19 and a tag member number or tag member identifier 20 that can be encoded in the HF/UHF combination chip 31 and which can also be imaged on a front 28 or back 29 surface of a card/tag 30 as desired, using inkjet, thermal transfer, laser, or other commercially available variable imaging process or other process to be developed in the future. A tag/card 30 also preferably includes a tag identification number 18 that is encoded in HF/UHF combination chip 31 and which can also be imaged on a front 28 or back 29 surface of a card/tag 30 as desired, using inkjet, thermal transfer, laser, or other commercially available variable imaging process or other similar process to be developed in the future.

A front 28 of a tag or card 30 can be blank. A front 28 can also have carrier specific branding printed on it, or tag identifying information (e.g., number 18, bar-code 15/16, passenger name 19, a frequent traveler number which can be a number 20, etc.) that can be a full or partial representation of the data shown on the other side of the tag. Likewise a back 29 of a tag or card 30 can be blank. A back 30 can also have carrier specific branding printed on it, or tag identifying information (e.g., number 18, bar-code 15/16, passenger name 19, a frequent traveler number which can be a number 20, etc.) that can be a full or partial representation of the data shown on the other side of the tag or card 30.

A tag or card 30 front 28 and/or back 29 can be opaque or transparent or semi-transparent. The antenna(s) and chip(s) inside a card or tag 30 often cannot be seen.

HF/UHF combination chip 31 is preferably encoded using NFC Data Exchange Format (NDEF) with code that can direct a smart device 21 that is NFC enabled, e.g., a smartphone, tablet, or other NFC enabled device, to a dedicated website or app where the code initializes the bag check-in interaction by delivering in the NFC encode string identification data that is unique to card's/tag's 30 HF/UHF combination chip 31. The NFC encode string may include such data as a tag identification number 18 of HF/UHF combination chip 31, which can be a serial number, or other unique identifier, assigned to the tag/card 30 and that is encoded into the HF/UHF combination chip's 31 Electronic Product Code (EPC) memory. The NDEF encode string can also include the tag member number or identifier 20. The delivery of the unique identifying information from the card's/tag's 30 HF/UHF combination chip 31 preferably allows the website or app to associate the tag/card 30 with an account and travel itinerary or ticket reservation of the passenger/traveler by associating the tag identification number 18, and therefore the card/tag 30, with a ticket number, reservation number, frequent traveler number, or other identification element that is unique to the specific passenger for whom the tag/card 30 is associated. The tag identification number 18 can be included in data associated with the travel itinerary or ticket reservation and/or in data associated with the traveler's account to provide a link between the tag/card 30 and the travel itinerary or ticket reservation.

If a traveler's/passenger's account includes other family members, for example, or more than one pending travel itinerary, the traveler/passenger can designate to which person and which itinerary that the tag/card 30 is to be linked by navigating through appropriate instructions and prompts on the transport carrier's website/app.

Once the card's HF/UHF combination chip 31 is used to link the tag/card 30 to the travel reservation, the bag 22 can preferably be tracked through the transport carrier's baggage handling system using the HF/UHF combination chip 31's UHF RFID capability.

If a tag or card 30 includes a barcode, e.g., a Quick Response (QR) code including a vertical barcode 15 and horizontal barcode 16 as shown in FIG. 3C, preferably, the NDEF encode string of HF/UHF combination chip 31 includes data for the barcodes 15/16. A QR code scanner or reader can read the barcodes 15/16. A QR code reader app can be downloaded to a smart device 21. Human readable numbers 18 (tag identification number), and 19 (tag member number or tag member identifier) can also be included the NDEF encode string of HF/UHF combination chip 31. Preferably such a barcode 15/16 is unique to the specific card/tag 30 and also serves to support tracking through a baggage tracking system of the carrier. Preferably number 18 (tag identification number) is also unique to the specific card/tag 30 and also serves to support tracking through a baggage tracking system of the carrier. Tag member number 20 can also be unique to the specific card/tag 30 and also serves to support tracking through a baggage tracking system of the carrier, although in some embodiments the same tag member number 20 can be included on more than one baggage tag owned by the same traveler. Additionally, in one or more preferred embodiments, more than one tag can be associated with a passenger or traveler itinerary.

FIGS. 5A-5D depict another preferred embodiment of card/tag, designated by the numeral 40, that can be used in the method and/or system as depicted in FIG. 1 or FIG. 2. Card or tag 40 preferably is equipped with both NFC technology and RFID technology. Card or tag 40 as shown in FIGS. 5A-5D includes an HF/UHF combination chip 31 that has both NFC technology and RFID technology. Card/tag 40 is similar to card/tag 30 except that card/tag 40 includes a single NFC HF/UHF combination chip 31 that can function in both HF and UHF frequency ranges and that is connected to an HF/UHF combination antenna 35 that can function in both HF and UHF frequency ranges. Card or tag 40 can include the same or similar features, including materials, elements images on front and/or back surfaces, and dimensions as a card or tag 10, 30 and can function in a same or similar way as a card or tag, 10, 30. In the embodiment as shown in FIGS. 5A-5D, a QR code having vertical 15 and horizontal 16 barcodes is included. The QR code can be used by a transport facility baggage tracking system for processing and handling a bag 22 with card or tag 40 attached thereto. Other desired machine readable elements can also be included in card or tag 40 along with a HF/UHF combination chip 31 and HF/UHF combination antenna 35. In the embodiment of FIGS. 5A-5D front 28 can include a QR code like back 29 as shown in FIG. 5D. Front 28 in FIG. 5A is shown without a QR code for demonstration purposes so that the HF/UHF combination chip 31 and HF/UHF combination antenna 35 can be seen. Other suitable NFC chips or technology, HF chips or technology, UHF chips or technology, and RFID chips or technology that are currently available or to be developed in the future that will enable a card or tag 40 to function and be used in the manner as shown and described herein also can be used in one or more embodiments of a card or tag 40.

In FIGS. 6A-6D, another preferred embodiment of a tag or card is shown, designated by the numeral 50. Card or tag 50 can include the same or similar features, including materials, elements images on front and/or back surfaces, and dimensions as a card or tag 10, 30, 40 and can function in a same or similar way as a card or tag, 10, 30, 40 except that card or tag 50 does not include UHF technology. In this embodiment tag or card 50 has NFC technology, i.e., HF chip 11 and HF antenna 12, and machine readable technology, i.e., a QR code with vertical barcode 15 and horizontal barcode 16. The QR code can be used by a transport facility baggage tracking system for processing and handling of a bag 22 with card 50 attached thereto. Other desired machine readable elements can also be included in card or tag 50 along with an HF chip 11 and HF antenna 12. In the embodiment of FIGS. 6A-6D front 28 can include a QR code like back 29 as depicted in FIG. 6D. Front 28 in FIG. 6A is shown without a QR code for demonstration purposes so that the HF/UHF combination chip 31 and HF/UHF combination antenna 35 can be seen. Other suitable NFC chips or technology, HF chips or technology, RFID chips or technology, and other machine readable elements that are currently available or to be developed in the future that will enable a card or tag 50 to function and be used in the manner as shown and described herein also can be used in one or more embodiments of a card or tag 50.

In some embodiments, a card/tag 10, 30, 40, 50 is made from paper or other non-synthetic material and is about 4 to 36 mils thick (100 to 915 microns).

Preferably a card/tag 10, 30, 40, 50 is made of a material enabling it to be used for multiple trips and multiple years, e.g., about 1 to 10 years, or more as desired.

In some embodiments, a card/tag 10, 30, 40, 50 does not conform to ISO 7810 ID-Type 1 form factor specifications and functions in the same or substantially similar manner to a card/tag 10, 30, 40, 50 as described above.

In some embodiments, e.g., as shown in FIGS. 6A-6D, a baggage tag/card can include NFC HF technology for initiating bag check-in in conjunction with an NFC enabled device and a barcode or other machine readable element that can be linked to and used with a transport carrier's bag transportation system, wherein the baggage card/tag does not include UHF RFID technology.

One or more tags/cards 10, 30, 40, 50 can be ordered or purchased by a traveler or passenger from a transport carrier, e.g., an airline (e.g., Delta Air Lines or American Airlines, etc.), a bus (Greyhound, etc.), or a train (Amtrak, SNEF, etc.) or a cruise line (e.g., Carnival Cruise Line)) prior to a scheduled trip, for example. Each tag/card 10 preferably includes a unique tag identification number 18 which is preferably encoded into UHF chip's 13 memory. Each tag/card 30, 40 preferably includes a unique tag identification number 18 which is preferably encoded into UHF/HF combination chip 31's memory. Each tag/card 50 preferably includes a unique tag identification number 18 which is preferably part of a machine readable element's data, e.g., a QR code's data of vertical 15 and horizontal 16 barcodes and/or as part of an HF chip 11. A card/tag 10, 30, 40, 50 also preferably includes a tag member number or tag member identifier 20 that identifies the passenger or traveler, and which is preferably embedded into UHF chip's 13 memory of a card or tag 10, or UHF/HF combination chip 31's memory of a card or tag 30, 40, or part of data of a machine readable element (e.g., a QR code with vertical 15 and horizontal 16 barcodes) and/or chip 11 of a card or tag 50.

At the time of purchasing, being given, or otherwise acquiring a tag/card 10, 30, 40, 50 the tag/card 10, 30, 40, 50 can be linked to an account of a traveler that is established with a transport carrier and wherein account information can be stored in a transport carrier's server, e.g., a secure server. A card 10, 30, 40, 50 can also be linked to a card holder acquiring the card 10, 30, 40, 50 in a transport carrier's server, e.g., a baggage tracking system server, without a specific card holder account being established or stored, and the car 10, 30, 40, 50 can later be linked to a specific travel reservation of the card holder that is stored in the transport carrier server.

If more than one card/tag 10, 30, 40, 50 is obtained by a single traveler/passenger, each tag/card 10, 30, 40, 50 can be linked to the account of a traveler/passenger that is established with a transport carrier with linking data or information for each tag/card 10, 30, 40, 50 stored in the account information on the transport carrier's server. If more than one card/tag 10, 30, 40, 50 is obtained by a single traveler/passenger, each tag/card 10, 30, 40, 50 can have the same tag member number or tag member identifier 20 while having different tag identification numbers 18. Alternatively, each tag/card 10, 30, 40, 50 can have a different tag member number or tag member identifier 20 and different tag identification numbers 18. At the time of purchase, the tag(s)/card(s) 10, 30, 40, 50 can be linked to identifying information of the traveler or passenger as set forth in the traveler's account and stored in a transport carrier's secure server, e.g., a secure internet server and/or a secure remote database. A traveler's/passenger's account information may include name, address, frequent traveler number, tag member number or tag member identifier 20, etc. A tag identification number 18 can be information or data in the account for linking with a particular baggage card or tag 10, 30, 40, 50. A traveler preferably can access the traveler's account on the transport carrier's website or app, e.g., with a password and log-in information.

A traveler's or passenger's account information can also include biometric data or markers unique to the passenger/traveler, which is stored in the transport carrier's server. The biometric data or markers, preferably are biometric data or markers that can be collected by a mobile phone, tablet, or similar device, and which are unique identification features such as fingerprint, voice signature, palm print, hand geometry, facial geometry (facial recognition markers), brain signals (electroencephalogram), heart signals (electrocardiogram), or other unique physiological characteristic that can be captured now or in the future by the device.

Preferably, the tag(s)/card(s) 10, 30, 40, 50 will be linked to a same traveler account through which the traveler/passenger purchases transport tickets and receives travel itineraries and ticket reservations.

If a traveler's/passenger's account includes information on more than one family member, for example, or more than one pending travel itinerary, one or more cards or tags 10, 30, 40, 50 can be associated with one family member of the account and one or more additional cards or tags 10, 30, 40, 50 can be associated with another family member of the account.

In some embodiments it may be possible that a single card/tag 10, 30, 40, 50 could be used by more than one person, e.g., more than one family member if a parent uses the card/tag 10, 30, 40, 50 for one itinerary, and a child uses the same card/tag 10, 30, 40, 50 for another later itinerary, and wherein both itineraries are purchased through the same traveler/passenger account of the transport carrier. In these embodiments, when checking-in a bag as described further below, the traveler/passenger could choose which person on the account and itinerary the card/tag 10, 30, 40, 50 is being used for when checking a bag 22 into the transport carrier's baggage tracking system.

In some embodiments, after purchasing a card/tag 10, 30, 40, 50 from one transport carrier, e.g., from Delta Air Lines, and linking the card/tag 10, 30, 40, 50 to a Delta Air Lines account for the traveler/passenger for use with a Delta Air Lines bag tracking system, the same card or tag 10, 30, 40, 50 can also later be linked to an account of the same traveler/passenger with another transport carrier, e.g., American Airlines, for use with an American Airlines bag tracking system.

Turning now to the system and/or method as shown in FIGS. 1 and 2, a baggage card or tag 60 is illustrated coupled to bag 22. Tag or card 60 can be a tag or card 10, 30, 40, or 50. Generally, a card or tag 60 can be the same or similar to a card or tag 10, 30, 40, or 50, and function in a same or similar way as a card or tag 10, 30, 40, 50 as described herein.

Card 60 is attached to a bag 22 prior to a passenger/traveler conveying bag 22 to a transport carrier's baggage tracking system. A bag 22 can be a desired typical travel bag or suitcase or other desired form of luggage. A bag 22 that has already been checked-in to a transport carrier's baggage tracking system via use of a passenger's or traveler's smart device 21, e.g., a mobile phone, tablet or other NFC enabled device, can use a transport carrier's expedited bag drop option represented by numeral 23 in FIG. 1 or 34 in FIG. 2. At the expedited bag drop option 23, 34 if desired, a traveler's/passenger's identity can be verified to match the account information for the checked-in bag 22, either by personnel checking identification or biometric markers of the passenger/traveler at an expedited baggage drop 23 of FIG. 1, or by an automatic baggage drop machine (represented by numeral 34 in FIG. 2) provided for checking biometric markers of the traveler/passenger. If a card holder does not have an account set up, biometric data of a card holder stored in a carrier's server can be used to verify that the person dropping the bag is the card holder.

A bag 22 with a card/tag 60 coupled thereto can be checked-in by a passenger or traveler remotely, prior to arrival at a transport facility, e.g., prior to arrival at an airport, using a smart device 21, which can be a mobile smart phone, a tablet or other desired NFC enabled device. A bag 22 can also be checked-in by a passenger or traveler while on grounds at a transport facility using a smart device 21, e.g., using a passenger's/traveler's own smart device 21 after the passenger/traveler has already arrived at a transportation facility, but without the passenger or traveler needing to visit the transportation facility's baggage check-in kiosk or check-in counter.

Preferably, a smart device 21 is portable or mobile. Preferably, a smart device 21 is the passenger's or traveler's own smart device 21 that they are taking with them for the trip. A smart device 21 preferably is not a smart device of the transportation facility and preferably is not a stationary self-service kiosk or a stationary computer at the transport facility as use of a transport carrier's device, kiosk or computer can cause delays. However, check-in of a bag can optionally be affected through use of a transport facilities smart device, check-in kiosk or stationary computer, e.g., if a passenger or traveler forgot a mobile smart device 21, or a mobile smart device 21 is not working, or a passenger or traveler otherwise needs assistance checking-in a bag 22.

In the method and/or system as shown in FIG. 1, to check in a bag 22 to a transport carrier's baggage tracking system, which can be done at a location remote from a transport facility at which the bag will be delivered to the transport carrier's baggage tracking system, a smart device 21 reads an NFC chip of card or tag 60, which can be an HF chip 11 as shown with regard to card/tag 10, 50, or a combination HF/UHF chip 31 as shown with regard to card or tag 30, 40 and the smart device opens a private website on smart device 21 (or opens a software application (app) that is downloaded to the smart device 21). The NDEF encoding of an HF chip 11 or HF/UHF combination chip 31 embedded in the card 60 can deliver an executable directive that can direct either an app, or the internet browser on the smart device to a specific website, e.g., a transport carrier's website or app. Upon landing at the website or app, a tag member number or tag member identifier 20 (e.g., a tag or card number that is linked to traveler/passenger identification information in an account with the transport carrier and/or in a ticket reservation with the transport carrier) and a tag identification number 18 of a UHF chip 13, e.g., an RFID UHF chip, of the baggage tag or card 60 is delivered to the transport carrier's website or app.

A smart device 21 preferably can read HF chip 11, or HF/UHF combination chip 31, or another suitable NFC element of baggage tag or card 60 when smart device 21 is within about 1 to 10 cm of baggage tag or card 60. QR code with barcode 15/16 data of a tag or card 60 can also be delivered through the NDEF encode string to a transport carrier's website or app, e.g., if a card or tag 60 has a barcode component and does not have a UHF component, or if a QR code with barcodes 15/16 will be used in conjunction with a UHF component.

Baggage tag or card 60 data linking the baggage tag or card 60 to the passenger/traveler and/or to the ticket reservation of the passenger/travel is conveyed over the air through a mobile data network or by a Wi-Fi internet connection represented by numeral 25 to the transport carrier's bag tracking system (represented by numeral 26) to check in the bag to the transport carrier's bag tracking system. Mobile data network/Wi-Fi internet connection 25 can include cell towers, a mobile network, Wi-Fi internet connection, and/or a wireless network.

Before or after checking-in bag 22, card 60 is attached to bag 22. Card 60 is attached to bag 22 prior to a passenger/traveler conveying bag 22 to a transport carrier's baggage tracking system 26. A bag 22 that is already checked-in can be delivered to a transport carrier's expedited bag drop option 23. In the embodiment of FIG. 1, expedited drop bag option 23 can include personnel, who may or may not verify one or more biometric markers of the person dropping the bag and/or check and record a bag 22 weight, etc. as desired by a transport carrier. If a bag is over a desired weight, a charge can be added to the passenger/traveler account or can be collected at the expedited bag drop option 23.

The carrier monitors progress of bag 22 during the course of the passenger itinerary and inputs data on bag's 22 progress or status to the website or app. The information on the progress of a bag 22 can be monitored at various check points wherein airport bag tracking UHF devices or readers and/or barcode scanners and/or other machine readable scanners, e.g., a QR reader can read information embedded in a UHF RFID chip 13 of a tag/card 60, an HF/UHF combination chip 31 of a tag/card 60, a barcode 15 and/or 16 of tag/card 60 or another machine readable element of a tag/card 60. As mentioned a barcode, such as a QR barcode, or other machine readable technology that a transport carrier may use can be used in conjunction with UHF RFID technology or can be used instead of UHF RFID technology.

Status information for a bag 22 can be stored in the transport carrier's baggage tracking system and made available on the transport carrier's website or app at various stages of the bag's 22 journey to a passenger or traveler's account. A passenger/traveler can use their smart device and a mobile or Wi-Fi internet connection or wireless connection (represented by the numeral 25 in FIG. 1) to log into the passenger/traveler account with the transport carrier and to check the status of the checked bag 22 as updated and reported on the transport carrier's website or app until bag 22 is retrieved at a baggage claim area (represented by the numeral 24 in FIG. 1) in the destination city of the passenger/traveler.

In the method and/or system as shown in FIG. 2, to check in a bag 22 to a transport carrier's baggage tracking system, which can be done at a location remote from a transport facility at which the bag 22 will be delivered to a baggage tracking system, smart device 21 reads an NFC chip of card or tag 60, which can be an HF chip 11 as shown with regard to card/tag 10, 50, or a combination HF/UHF chip 31 as shown with regard to card or tag 30, 40 and the smart device opens a private website on smart device 21 (or opens a software application (app) that is downloaded to the smart device 21). The NDEF encoding of an HF chip 11 or HF/UHF combination chip 31 embedded in the card 60 can deliver an executable directive that can direct either an app, or the internet browser on the smart device to a specific website, e.g., a transport carrier's website or app. Upon landing at the website or app, a tag member number or tag member identifier 20 (e.g., a tag or card number that is linked to traveler/passenger identification information in an account with the transport carrier and/or in a ticket reservation with the transport carrier) and a tag identification number 18 of a UHF chip 13, e.g., an RFID UHF chip, of the baggage tag or card 60 is delivered to the transport carrier's website or app.

A smart device 21 preferably can read HF chip 11, or HF/UHF combination chip 31, or another suitable NFC element of baggage tag or card 60 when smart device 21 is within about 1 to 10 cm of baggage tag or card 60. QR code with barcode 15/16 data of a tag or card 60 can also be delivered through the NDEF encode string to a transport carrier's website or app, e.g., if a card or tag 60 has a barcode component and does not have a UHF component, or if a QR code with barcodes 15/16 will be used in conjunction with a UHF component.

Baggage tag or card 60 data linking the baggage tag or card 60 to the passenger/traveler and/or to the ticket reservation of the passenger/travel is conveyed over the air through a mobile data network or Wi-Fi internet connection represented by numeral 25 to the transport carrier's bag tracking system (represented by number 26) to check in the bag to the transport carrier's bag tracking system 26. Mobile data network 25 can include cell towers, a mobile network, Wi-Fi internet connection, and/or a wireless network. Smart device 21 can also capture one or more biometric markers such as fingerprint, facial geometry, or other individually unique characteristic that is passed to the carrier's website at the time the bag is checked.

Before or after checking in bag 22, card 60 is attached to bag 22. Card 60 is attached to bag 22 prior to a passenger/traveler conveying bag 22 to a transport carrier's baggage tracking system. Bag 22 that is already checked in can be delivered to a transport carrier's expedited bag drop option. In FIG. 2, the expedited bag drop option is an automatic baggage drop option 34. Bags 22 that are already checked-in can use the transport carriers' expedited bag drop option 34 that may include human verification of the person dropping the bag, or automation to allow for verification of the identity of the person conveying the bag through checking that individual's biometric markers with the biometric markers on file for the passenger and/or with those collected at the time the bag was checked using the smart device 21, e.g., a smartphone, tablet, or similar device. An automatic baggage drop option 34 can also collect bag data on bag 22 weight, etc. as desired by a transport carrier. If a bag weighs over a desired amount, a charge can be added to the passenger/traveler account or payment can be collected at the automatic baggage drop option 34.

The carrier monitors progress of bag 22 during the course of the passenger itinerary and inputs data on bag's 22 progress or status to the website or app. The information on the progress of a bag 22 can be monitored at various check points wherein airport bag tracking UHF devices or readers and/or barcode scanners and/or other machine readable scanners, e.g., a QR reader, can read information embedded in a UHF RFID chip 13 of a tag/card 60, an HF/UHF combination chip 31 of a tag/card 60, a barcode 15 and/or 16 of tag/card 60 or another machine readable element of a tag/card 60. As mentioned a barcode, such as a QR barcode, or other machine readable technology that a transport carrier may use can be used in conjunction with UHF RFID technology or can be used instead of UHF RFID technology.

Status information for a bag 22 can be stored in the transport carrier's baggage tracking system and made available on the transport carrier's website or app at various stages of the bag's 22 journey to a passenger or traveler's account. A passenger/traveler can use their smart device and a mobile or Wi-Fi or wireless connection (represented by the numeral 25 in FIG. 2) to log into the passenger/traveler account with the transport carrier and to check the status of the checked bag 22 as updated and reported on the transport carrier's website or app until bag 22 is retrieved at a baggage claim area (represented by the numeral 24 in FIG. 2) in the destination city of the passenger/traveler. In one or more preferred embodiments, NDEF encoding data from an HF chip 11 or HF/UHF combination chip 31 is combined with one (unimodal) or more (multimodal) biometric markers or data that can be captured by a smart device 21, e.g., a mobile phone, tablet, or similar device, and transmitted to a transport carrier. The passenger or traveler can also have the same one or more biometric markers or data registered with a transport carrier, e.g., linked to the passenger's or traveler's account with the transport carrier. The biometric marker or markers or data transmitted to the transport carrier can then be used by the transport carrier for security purposes such as, but not limited to, the verification of the identity of the traveler/passenger checking the bag.

In one or more embodiments, the biometric markers can be used at the time the traveler checks in the bag from their smart device through biometric technology of the smart device that captures a biometric marker which can then be captured in the NDEF encode string and delivered to the transport carrier website for comparison/verification when checking in the bag.

In one or more embodiments, a carrier can use biometric markers or data at an automatic baggage drop machine to validate that the passenger/traveler dropping off the bag matches the traveler/passenger that checked the bag 22 into their system and assigned it to a travel itinerary.

A card holder of a card or tag 10, 30, 40, 50 can provide data on one or more biometric markers of the card holder to the transport carrier for storing in the transport carrier server. The card holder of the card or tag 10, 30, 40, 50 along with the biometric data can be linked with the card or tag 10, 30, 40, 50 in the carrier's server, for later linking with the travel reservation and travel account. The card holder of the card or tag 10, 30, 40, 50 along with the biometric data can be linked with the card or tag 10, 30, 40, 50 in the carrier's server, for later linking with a card holder travel reservation and travel account.

The biometric data, or markers, collected by a smart device 21, e.g., a mobile phone, tablet, or similar device, can include one or more unique identification features such as fingerprint, voice signature, palm print, hand geometry, facial geometry (facial recognition markers), brain signals (electroencephalogram), heart signals (electrocardiogram), or other unique physiological characteristic that can be captured now or in the future by the device itself, or by an accessory that connects to the device using a wireless or wired connection.

A tag/card 10, 30, 40, 50 or 60 can be used with airline baggage tracking systems. A tag/card 10, 30 or 60 can also be used with other types of transport baggage tracking systems, e.g., at a train or bus station or with ships or sea travel, for example.

The following is a list of parts and materials suitable for use in the present invention:

| PART NUMBER | DESCRIPTION |
| --- | --- |
| 10 | baggage tag or card |
| 11 | HF chip |
| 12 | HF antenna |
| 13 | UHF chip |
| 14 | UHF unique antenna |
| 15 | vertical barcode |
| 16 | horizontal barcode |
| 17 | opening |
| 18 | tag identification number |
| 19 | passenger/traveler name |
| 20 | tag member number/tag member identifier/frequent traveler number |
| 21 | smart device |
| 22 | bag |
| 24 | baggage claim area |
| 25 | mobile data network |
| 26 | transport carrier's bag tracking system |
| 28 | front |
| 29 | back |
| 30 | baggage card or tag |
| 31 | NFC HF/UHF combination chip |
| 32 | UHF antenna |
| 33 | HF antenna |
| 40 | baggage card or tag |
| 50 | baggage card or tag |
| 60 | baggage card or tag |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A baggage tracking system comprising:
   a) a card or tag coupled to a luggage item and wherein, prior to use of the card or tag in a check-in transaction event, identification data for the card or tag is linked to an account of a traveler including account identifying information at a transport carrier website or software application (app), the card or tag including:
      i) a High Frequency (HF) chip affixed to an HF antenna, the HF antenna tuned to operate in a designated HF frequency range in a passive manner such that the HF antenna is not physically connected to a power source; and ii) an Ultra High Frequency (UHF) Radio-Frequency IDentification (RFID) chip affixed to a UHF antenna tuned to operate in a designated UHF frequency range in a passive manner such that the UHF antenna is not physically connected to a power source;
wherein the HF chip of the card or tag is encoded, prior to receipt by the traveler, using Near Frequency Communication (NFC) Data Exchange Format (NDEF) with executable code that is permanent and for directly delivering an executable directive via wireless data transfer to an NFC enabled device to open the transport carrier website or app, and wherein the executable code wirelessly delivers the executable directive to the transport carrier website or app in an NDEF encode string that includes initiation of an automated process to associate said card or tag with a travel itinerary associated with the account using the identification data that is unique to the card or tag, and wherein biometric data is captured by the NFC enabled device, which is then also captured in the executable code and delivered to the transport carrier website or app;

b) the NFC enabled device powering the HF chip by an electromagnetic field of the NFC enabled device when positioned to interact with the card or tag and reading and receiving the executable code of the HF chip including the executable directive, opening the transport carrier website or app on the NFC enabled device, and delivering the identification data of the executable code to the transport carrier website or app as required by the automated process initiated by response of the NFC enabled device to direction given in the NDEF encode string;

c) the NFC enabled device capturing biometric data in real-time on the traveler, which is combined with the executable code, and directly delivering the biometric data to the transport carrier website or app with the NDEF encode string at the time the luggage item is being checked-in, which the transport carrier website or app uses for security purposes to confirm that the identity of a person checking-in the luggage item with the card or tag attached to the luggage item matches the identity of the traveler associated with the account;

d) a transport carrier baggage tracking system that is operable to read the UHF RFID chip of the card or tag and to process and handle the luggage item to which the card or tag is coupled;

e) the transport carrier website or app adapted to accept and process the identification data of the executable code and biometric markers received by the NFC enabled device, to recognize the identification data that is unique to the card or tag and stored in the executable code, to recognize the biometric markers, and to automatically associate the identification data and biometric markers with information stored on the traveler and associated with the account at the transport carrier website or app, including the travel itinerary and luggage item tracking information, wherein the information is also accessible by the traveler through the account, and the transport carrier website or app operable to link the account with the transport carrier baggage tracking system;

wherein the NFC enabled device checks-in the card or tag, and thus said luggage item on which the card or tag is coupled, with the transport carrier baggage tracking system from a location that is remote from a departing transportation facility at which the luggage item will be physically conveyed to the transport carrier baggage tracking system when the executable code of the HF chip directs the NFC enabled device to open the transport carrier website or app and directly and automatically delivers the identification data for said card or tag along with the biometric data captured by the NFC enabled device to the transport carrier baggage tracking system through the transport carrier website or app and causes the transport carrier baggage tracking system to receive the identification data and the biometric data within the executable code of the HF chip, to associate the card or tag with the travel itinerary of the traveler, and to automatically link the card or tag to the travel itinerary associated with the account to complete check-in of the luggage item to which the card or tag is coupled with the transport carrier baggage tracking system without the card or tag holder stopping at a bag check-in kiosk or counter at a transportation carrier facility or engaging in bag check-in steps other than a step of placing the card or tag in proximity of the NFC enabled device;

wherein the check-in transaction event occurs via automatic delivery of the NDEF encode string to the transport carrier website or app when the NFC enabled device reads the HF chip of the card or tag and an association or link is automatically made between the card or tag and the travel itinerary;

wherein the executable code of the HF chip including the identification data of the card or tag is permanent and is not re-written during check-in or at a checkpoint of the transport carrier baggage tracking system and wherein no traveler record data for a trip is written to the card or tag but is instead stored and updated in the account of the traveler on the transport carrier website or app;

wherein the transport carrier baggage tracking system uses the UHF RFID chip for processing and handling of the luggage item from the departing transportation facility, to a transport vehicle, to a destination transportation facility and to bag claim by the traveler; and wherein luggage item status information on the website or app is checked during the trip from the NFC enabled device as desired.

2. The system of claim 1, wherein information stored on the transport carrier website or app includes a ticket number, a reservation number, a frequent traveler number, a tag member number, and/or other desired identification elements that are unique to the traveler for whom the card or tag is associated.

3. The system of claim 1, wherein the executable code of the HF chip includes a unique serial number assigned to the card or tag that is encoded into Electronic Product Code (EPC) memory of the UHF RFID chip.

4. The system of claim 1 wherein the card or tag is made from rigid plastic conforming to ISO 7810 ID-Type 1 form factor specifications that is 7 mil to 30 mil (180 to 760 microns) thick.

5. The system of claim 1 wherein the card or tag is constructed of PVC, PET, styrene, polypropylene, Tyvek®, or other synthetic material that is 7 mil to 30 mil (180 to 760 microns) thick.

6. The system of claim 1, wherein the card or tag is made from paper or other non-synthetic material that is 4 to 36 mils (100 to 915 microns) thick.

7. The system of claim 1 wherein the executable code includes data for a barcode or human readable number that is unique to the card or tag and also serves to support tracking through the transport carrier baggage tracking system.

8. The system of claim 1, wherein the card or tag does not conform to ISO 7810 ID-Type 1 form factor specifications.

9. The system of claim 1, wherein the UHF RFID chip has a frequency of 860 to 960 MHz and is readable from a distance of up to 20 meters.

10. The system of claim 1, wherein the HF chip has a frequency of 13.56 MHz and is readable from a distance of less than 1 meter.

11. A baggage tracking system comprising:
 a) an account including account identifying information for a traveler included on a transport carrier website or software application (app);
 b) a card or tag coupled to a luggage item and linked to the account prior to use of the card or tag in a check-in event, the card or tag including:
  i) a High Frequency (HF) chip affixed to a passive HF antenna; and
  ii) a barcode that is permanently assigned to the card or tag and which includes identification data that is unique to the card;
  wherein, prior to receipt of the card or tag by the traveler, the HF chip is encoded using Near Frequency Communication (NFC) Data Exchange Format (NDEF) with permanent executable code including an executable directive for directing an NFC enabled device to open the transport carrier website or app and including the identification data that is unique to the barcode, wherein the executable code delivers in an NFC encode string the identification data that is unique to the card or tag to the transport carrier website or app, and wherein biometric data is captured by the NFC enabled device, which is then also captured in the executable code and delivered to the transport carrier website or app;
 c) the NFC enabled device adapted to power the HF chip by an electromagnetic field of the NFC enabled device when positioned to interact with the card or tag and which reads the HF chip of the card or tag, receives the executable code of the HF chip including the executable directive, opens the transport carrier website or app on the NFC enabled device, and delivers the identification data of the barcode to the transport carrier website or app;
 d) a transport carrier baggage tracking system that is operable to read the barcode of the card or tag and to process and handle the luggage item;
 e) the transport carrier website or app adapted to accept and process the identification data of the executable code received by the NFC enabled device, to recognize the identification data that is unique to the card or tag and stored in the executable code, to automatically associate the identification data with information stored on the account including a travel itinerary and luggage item status information, and to automatically link the card or tag on the luggage item and the account with the transport carrier baggage tracking system;
  wherein the NFC enabled device captures live biometric data on the traveler, which is combined with the executable code, and directly delivers the live biometric data to the transport carrier website or app with the executable code and the NFC encode string, which the transport carrier website or app uses for security purposes to confirm that the identity of a person checking-in the card or tag, along with the luggage item coupled to the card or tag, matches the identity of the traveler associated with the account;
  wherein the NFC enabled device checks-in the card or tag, and thus the luggage item attached to the card or tag, and verifies identity of the traveler with the transport carrier baggage tracking system from a location that is remote from a transport facility at which the luggage item will be physically conveyed to the transport carrier baggage tracking system when the executable code of the HF chip directs the NFC enabled device to open the transport carrier website or app and automatically and directly delivers the identification data for said card or tag and the live biometric data to the transport carrier baggage tracking system through the transport carrier website or app and allows the transport carrier website or app to receive the identification data and the live biometric data within the HF chip's executable code, to automatically associate the card or tag with the travel itinerary of the traveler associated with the account and to link the card or tag to the travel itinerary in the transport carrier baggage tracking system to check-in the luggage item;
  wherein check-in is completed when the executable directive read by the NFC enabled device causes the NFC encode string to be delivered from the NFC enabled device to the transport carrier website or app and a link is automatically made between the card or tag and the travel itinerary without a card or tag holder stopping at a bag check-in kiosk or counter at a departing transportation carrier facility or engaging in check-in steps other than a step of placing the card or tag in proximity of the NFC enabled device;
  wherein the transport carrier baggage tracking system uses the barcode of the card or tag, which is associated with the account and the travel itinerary, to route and track movement of the luggage item, and for processing and handling of the luggage item from the departing transportation carrier facility, to a transport vehicle, to a destination transportation facility and to bag claim;
  wherein the permanent executable code of the HF chip is not re-written during check-in or during processing of the luggage item by the transport carrier baggage tracking system and wherein no traveler record data for a trip is written to the tag or card; and
  wherein the luggage item status information on the transport carrier website or app during a trip is checked from the NFC enabled device as desired.

12. A baggage tracking system for tracking a luggage item during a trip comprising:
 a) an account of a traveler, wherein the account is maintained on a transport carrier website or software application (app);
 b) a card or tag coupled to the luggage item, wherein the card or tag is linked to the account prior to use of the card or tag in a check-in event, and wherein the card or tag includes a chip that functions in both HF and UHF frequency ranges, the chip having a connection to a passive HF antenna and another connection to a passive UHF antenna, wherein the chip is encoded, prior to the traveler receiving the card or tag, using Near Frequency Communication (NFC) Data Exchange Format (NDEF) with permanent executable code including an executable directive for directing an NFC enabled device to open the transport carrier website or app wherein the permanent executable code delivers to the transport carrier website or app in an NFC encode string identification data that is unique to the chip of the card or tag, and wherein biometric data is captured by the NFC enabled device, which is then also captured in the executable code and delivered to the transport carrier website or app;

c) the NFC enabled device adapted to power the chip by an electromagnetic field of the NFC enabled device when positioned to interact with the card or tag, and which reads the HF chip of the card or tag using HF frequency, receives the executable code of the HF chip including the executable directive, opens the transport carrier website or app on the NFC enabled device, and delivers the identification data of the HF chip to the transport carrier website or app;

d) a transport carrier baggage tracking system that is operable to read the chip of the card or tag using UHF frequency and to process and handle the luggage item to which the card or tag is coupled;

e) the transport carrier website or app adapted to accept and process the identification data of the executable code received by the NFC enabled device, to recognize the identification data that is unique to the card or tag and stored in the executable code, to associate the identification data with information stored on the account, including a travel itinerary and luggage item status information, and to link the account with the transport carrier baggage tracking system;

wherein the NFC enabled device, at a location that is remote from the transport carrier baggage tracking system, checks-in the luggage item with the transport carrier baggage tracking system using HF functionality of the HF chip of the card or tag and transmitting the executable code of the HF chip that directs the NFC enabled device to open the transport carrier website or app and deliver the identification data that is unique to the card or tag to the transport carrier website or app;

wherein the NFC enabled device also captures biometric data in real-time on the traveler that is combined with the executable code that is directly delivered to the transport carrier website or app with the NFC encode string, which enables complete remote check-in and traveler verification in a step of transmitting the NFC encode string to the transport carrier website or app;

wherein the transport carrier website or app allows the identification data within the NFC encode string to automatically associate the card or tag with the travel itinerary of the traveler that is already associated with the account and to link the card or tag to the travel itinerary and subsequently to the transport carrier baggage tracking system to check-in the luggage item;

wherein the check-in event is completed when the NFC encode string is delivered from the NFC enabled device to the transport carrier website or app and the link between the tag or card and the account and the travel itinerary is automatically established on the transport carrier website or app and in the transport carrier baggage tracking system without a card or tag holder stopping at a bag check-in kiosk or counter at a departing transportation carrier facility or engaging in check-in steps other than a step of placing the card or tag in proximity of the NFC enabled device;

wherein the transport carrier baggage tracking system routes and tracks movement of the luggage item using UHF capabilities of the card or tag, which are associated with the traveler and the account, for processing and handling of the luggage item from the departing transportation facility, to a transport vessel, to a destination transportation facility and to bag claim;

wherein traveler record data for a trip is not written to the card or tag and instead is maintained and updated in the account on the transport carrier website or app; and wherein luggage item status on the website or app is checked from the NFC enabled device during the trip as desired.

13. A baggage tracking system comprising:

a) an account associated with a traveler;

b) a card or tag coupled to a luggage item and wherein the card or tag is linked to the account prior to initiating a check-in event, the card or tag including a chip that operates in both HF and UHF frequency ranges, the chip having a connection to an antenna that operates in both HF and UHF frequency ranges, wherein the chip is encoded using Near Frequency Communication (NFC) Data Exchange Format (NDEF) with permanent code including executable data for directing an NFC enabled device to open a transport carrier website or software application (app) wherein the permanent code delivers in an NFC encode string identification data that is unique to the chip of the card or tag, and wherein biometric data is captured by the NFC enabled device, which is then also captured in the permanent code including executable data and delivered to the transport carrier website or app;

c) the NFC enabled device that is operable to read the chip of the card or tag using HF frequency;

d) a transport carrier baggage tracking system that is operable to read the chip of the card or tag using UHF frequency and to process and handle the luggage item to which the card or tag is coupled;

e) the transport carrier website or app storing information on the account including a travel itinerary and luggage item status information, and the transport carrier website or app operable to link the account with the transport carrier baggage tracking system upon receipt of the executable data and NFC encode string;

wherein the NFC enabled device is operated at a location that is remote from the transport carrier baggage tracking system and checks-in the luggage item with the transport carrier baggage tracking system, using functionality of the HF chip of the card or tag that directly transmits the permanent code from the HF chip, directs the NFC enabled device to open the transport carrier website or app and automatically delivers the identification data that is unique to the card or tag to the transport carrier website or app;

wherein the transport carrier website or app is adapted to allow the identification data within the NFC encode string to associate the card or tag with the travel itinerary of the traveler based on a previously established association of the traveler and the account in the transport carrier baggage tracking system and to link the card or tag to the travel itinerary in the transport carrier baggage tracking system to check-in the luggage item;

wherein the check-in event is completed in a single step when the NFC encode string is delivered from the NFC enabled device to the transport carrier website or app where an automatic association with the account and travel itinerary is made without a card or tag holder stopping at a bag check-in kiosk or counter at a departing transportation carrier facility and engaging in check-in steps other than the single step of placing the card or tag in proximity of the NFC enabled device;

wherein traveler record data for a trip is not written to the card or tag and instead is maintained and updated in the account on the transport carrier website or app;

wherein the transport carrier baggage tracking system routes and tracks movement of the luggage item through interactions with functionality of the UHF chip of the card or tag for processing and handling of the luggage item from the departing transportation facility, to a transport vehicle, to a destination transportation facility and to a bag claim area; and wherein luggage item status information on the transport carrier website or app is checked from the NFC enabled device during the trip as desired.

14. A method of checking-in and tracking baggage from a departing destination to an arrival destination, the method comprising the following steps:
  a) obtaining a card or tag having identification data that is linked to a travel account on a transport carrier website or software application (app), the travel account having account identifying information of an account holder that is linkable to one or more travel itineraries, and the card or tag including:
    i) Near Field Communication (NFC) technology that is encoded using NFC Data Exchange Format (NDEF) with permanent code including executable data for directing an NFC enabled device to open a transport carrier website or software application (app) on the NFC enabled device wherein encoded data delivers in an NFC encode string the identification data that is unique to the card or tag, and wherein biometric data is captured by the NFC enabled device, which is then also captured in the permanent code including executable data and delivered to the transport carrier website or app; and
    ii) machine readable technology that is operable to be read by and used in conjunction with a transport carrier baggage tracking system;
  b) coupling the card or tag to a luggage item;
  c) checking in the luggage item with the transport carrier baggage tracking system by placing the card or tag in proximity of the NFC enabled device and verifying account holder identity at a location that is remote from the transport carrier baggage tracking system so that the NFC enabled device reads the NFC technology of the card or tag and captures biometric data of the account holder in real-time that is captured by the permanent code, and wherein the permanent code of the NFC technology directly directs the NFC enabled device to the transport carrier website or app and delivers the identification data that is unique to the card or tag along with the biometric data to the transport carrier website or app and the transport carrier website or app directly associates the card or tag with one of said travel itineraries associated with the account and automatically links the card or tag to said one travel itinerary in the transport carrier baggage tracking system to effect completed check-in of the luggage item and verification of identity of the account holder by comparing the biometric data that is captured by the NFC enabled device in real-time with one or more biometric markers of record in the travel account;

wherein a single step of check-in occurs without the account holder stopping at a bag check-in kiosk or counter at a transportation carrier facility or engaging in check-in steps other than placing the card or tag in proximity of the NFC enabled device; and d) checking status information of the luggage item during a trip from the transport carrier website or app, wherein the transport carrier website or app stores information on processing and handling of the luggage item during the trip, wherein said information is received from the transport carrier baggage tracking system's reading of the machine readable technology of the card or tag coupled to the luggage item;

wherein the permanent code, including the executable data, of the NFC technology is encoded on the card or tag prior to receipt by the account holder and is not rewritten or changed at check-in or at check-points of the transport carrier baggage tracking system; and wherein account holder record data for the trip is not written to the card or tag and instead is maintained and updated in the travel account on the transport carrier website or app.

15. The method of claim 14 wherein the NFC technology is an HF chip connected to an HF antenna and the machine readable technology is a UHF chip connected to a UHF antenna.

16. The method of claim 14 wherein the NFC technology is an HF chip connected to an HF antenna and the machine readable technology is a barcode.

17. The method of claim 14 wherein the NFC technology and the machine readable technology is part of a single chip that operates in HF and UHF frequency ranges, wherein the single chip is connected to both a UHF antenna and an HF antenna.

18. The method of claim 14 wherein the NFC technology and machine readable technology is part of a single chip that operates in HF and UHF frequency ranges, wherein the single chip is connected to a single antenna that is tuned to desired HF and UHF frequencies.

19. The method of claim 15 wherein the UHF chip has a UHF frequency of 860 to 960 MHz and is readable from a distance of up to 20 meters and the HF chip has an HF frequency of 13.56 MHz and is readable from a distance of less than 1 meter.

20. The method of claim 16 wherein the HF chip has an HF frequency of about 13.56 MHz and is readable from a distance of less than 1 meter.

21. The method of claim 17 wherein the chip has an HF frequency of 13.56 MHz and is readable from a distance of less than 1 meter and the chip has a UHF frequency of 860 to 960 MHz and is readable from a distance of up to 20 meters.

22. The method of claim 18 wherein the chip has an HF frequency of about 13.56 MHz and is readable from a distance of less than 1 meter, and the chip has a UHF frequency of about 860 to 960 MHz and is readable from a distance of up to 20 meters.

23. The method of claim 14 wherein initiating check-in occurs prior to arrival at a transport facility.

24. The method of claim 14 wherein initiating check-in occurs on grounds of a transport facility.

25. The method of claim 14 wherein the transport carrier baggage tracking system also captures biometric data for comparing with the one or more biometric markers at an automatic baggage drop machine to further validate that a card or tag holder dropping off the luggage item matches the account holder assigned to a said travel itinerary and/or the card or tag holder that checked in the luggage item.

26. The method of claim 14 wherein the one or more biometric markers stored in the travel account and the biometric markers captured in real-time by the NFC enabled device include one or more unique identification features such as fingerprint, voice signature, palm print, hand geometry, facial geometry (facial recognition markers), brain signals (electroencephalogram), heart signals (electrocardiogram), or other unique physiological characteristic.

27. A method for a transport carrier to track baggage from a departing destination to an arrival destination, the method comprising the following steps:
   a) providing a travel account with account identifying information of an account holder that is linkable to one or more travel itineraries and to a transport carrier baggage tracking system;
   b) providing a transport carrier website or software application (app) that stores information on and manages the travel account and the transport carrier baggage tracking system;
   c) providing a card or tag to the account holder, wherein the card or tag is linked to the travel account prior to initiating a check-in event, and wherein the card or tag includes:
      i) Near Field Communication (NFC) technology that is encoded using NFC Data Exchange Format (NDEF) with permanent code including executable data for directing an NFC enabled device of the account holder to the transport carrier website or app wherein the executable data that is encoded delivers an NFC encode string that directs the NFC enabled device to open the transport carrier website or app and deliver identification data that is unique to the card or tag, and wherein biometric data is captured by the NFC enabled device, which is then also captured in the permanent code including executable data and delivered to the transport carrier website or app; and
      ii) machine readable technology that is operable to be read by and used in conjunction with the transport carrier baggage tracking system;
   wherein the card or tag is adapted to be coupled to a luggage item of the account holder;
   wherein check-in of the luggage item to the transport carrier baggage tracking system occurs by placing the card or tag in proximity of the NFC enabled device of the account holder so that the NFC enabled device reads the NFC technology of the card or tag and wherein the permanent code of the NFC technology directly transmits the executable data including the NFC encode string directing the NFC enabled device to open the transport carrier website or app and automatically delivers the identification data that is unique to the card or tag, and directs the transport carrier website or app to associate the card or tag with one of the travel itineraries associated with the travel account and to automatically link the card or tag to said travel itinerary in the transport carrier baggage tracking system to cause completed check-in of the luggage item;
   d) receiving luggage item check-in information from the account holder after the account holder engages in a single step of placing the card or tag in proximity of the NFC enabled device of the account holder so that the NFC enabled device reads the NFC technology of the card or tag and wherein the executable data directs the NFC enabled device to open the transport carrier website or app and automatically delivers the identification data that is unique to the card or tag to the transport carrier website or app where the card or tag is automatically linked to said travel itinerary in the transport carrier baggage tracking system to cause check-in of the luggage item with the transport carrier baggage tracking system; and
   e) handling and processing the luggage item during a trip of the account holder from the departing destination, to the arrival destination, to bag claim by the account holder, wherein handling and processing of the luggage item includes delivering and updating luggage item status information during the trip to the transport carrier website or app, the luggage item status information viewable by the account holder on the transport carrier website or app;
   wherein the permanent code, including the executable data, of the NFC technology is included in the card or tag prior to receipt by the account holder and is not rewritten or changed at check-in of the luggage item or at check-points of the transport carrier baggage tracking system during the trip;
   wherein no account holder travel record information is written to the card or tag; and
   wherein check-in of the luggage item with a card or tag attached thereto occurs without a card or tag holder stopping at a bag check-in kiosk or counter at a transportation carrier facility and engaging in check-in steps other than a step of placing the card or tag in proximity of the NFC enabled device.

28. The method of claim 27 wherein the NFC technology of the card or tag that is provided is an HF chip connected to an HF antenna and the machine readable technology is a UHF chip connected to a UHF antenna.

29. The method of claim 27 wherein the NFC technology of the card or tag that is provided is an HF chip connected to an HF antenna and the machine readable technology is a barcode.

30. The method of claim 27 wherein the NFC technology of the card or tag that is provided and the machine readable technology is part of a single chip that operates in HF and UHF frequency ranges, wherein the single chip is connected to both a UHF antenna and an HF antenna.

31. The method of claim 27 wherein the NFC technology of the card or tag that is provided and the machine readable technology is part of a single chip that operates in HF and UHF frequency ranges, wherein the single chip is connected to a single antenna that is tuned to desired HF and UHF frequencies.

32. The method of claim 28 wherein the UHF chip has a UHF frequency of about 860 to 960 MHz and is readable from a distance of up to 20 meters and the HF chip has an HF frequency of about 13.56 MHz and is readable from a distance of less than 1 meter.

33. The method of claim 29 wherein the HF chip has an HF frequency of about 13.56 MHz and is readable from a distance of less than 1 meter.

34. The method of claim 30 wherein the chip has a UHF frequency of about 860 to 960 MHz and is readable from a distance of up to 20 meters and the HF chip has an HF frequency of about 13.56 MHz and is readable from a distance of less than 1 meter.

35. A baggage tracking card or tag for coupling to a luggage item during a trip, the card or tag comprising:
a) Near Field Communication (NFC) technology that is encoded using NFC Data Exchange Format (NDEF) with permanent code including executable data for directly directing an NFC enabled device of a card or tag holder to open a transport carrier website or software application (app) on the NFC enabled device wherein the permanent code delivers in an NFC encode string identification data that is unique to the card or tag and wherein biometric data is captured by the NFC enabled device, which is then also captured in the permanent code including executable data code and delivered to the transport carrier website or app; and
b) machine readable technology that is operable to be read by and used in conjunction with a transport carrier baggage tracking system;
wherein the card or tag is encoded with the permanent code prior to receipt by a card or tag holder;
wherein the card or tag is linked to a travel account of the card or tag holder established on the transport carrier website or app prior to use in a check-in event, and wherein the travel account includes card or tag holder identifying information and data on one or more travel reservations that are linked to a transport carrier baggage tracking system enabling the card or tag holder to remotely check-in a luggage item that has the card or tag coupled thereto with the transport carrier baggage tracking system from the NFC enabled device when the permanent code of the NFC technology directs the NFC enabled device to automatically deliver the identification data to the transport carrier website or app where an automatic association between the card or tag and the account is made and wherein the card or tag is linked to one said travel reservation to complete check-in of the luggage item with the card or tag coupled thereto without a card or tag holder stopping at a bag check-in kiosk or counter at a transportation carrier facility and engaging in check-in steps other than a step of placing the card or tag in proximity of the NFC enabled device;
wherein account holder record information for the trip is not written to the card or tag; and
wherein the machine readable technology is operable to be used in conjunction with and to be read by a transport carrier's baggage tracking system.

36. The card or tag of claim 35 wherein the NFC technology of the card or tag that is provided is an HF chip connected to an HF antenna and the machine readable technology is a UHF chip connected to a UHF antenna.

37. The card or tag of claim 35 wherein the NFC technology of the card or tag that is provided is an HF chip connected to an HF antenna and the machine readable technology is a barcode.

38. The card or tag of claim 35 wherein the NFC technology and the machine readable technology of the card or tag is part of a single chip that operates in HF and UHF frequency ranges, wherein the single chip is connected to both a UHF antenna and an HF antenna.

39. The card or tag of claim 35 wherein the NFC technology and the machine readable technology of the card or tag is part of a single chip that operates in HF and UHF frequency ranges, wherein the single chip is connected to a single antenna that is tuned to desired HF and UHF frequencies.

40. The card or tag of claim 36 wherein the UHF chip has a UHF frequency of 860 to 960 MHz and is readable from a distance of up to 12 meters and the HF chip has an HF frequency of 13.56 MHz and is readable from a distance of less than 1 meter.

41. The card or tag of claim 37 wherein the HF chip has an HF frequency of about 13.56 MHz and is readable from a distance of less than 1 meter.

42. The card or tag of claim 38 wherein the chip has a UHF frequency of about 860 to 960 MHz and is readable from a distance of up to 12 meters and the chip has an HF frequency of about 13.56 MHz and is readable from a distance of less than 1 meter.

43. The card or tag of claim 39 wherein the chip has a UHF frequency of about 860 to 960 MHz and is readable from a distance of up to 12 meters and the chip has an HF frequency of about 13.56 MHz and is readable from a distance of less than 1 meter.

44. The card or tag of claim 35, wherein the card or tag is used for more than one trip.

45. The card or tag of claim 35, wherein the card or tag is used for multiple trips and has a lifetime of 1 to 10 years.

46. A baggage tracking system comprising:
a) an account including account identifying information;
b) the card or tag of claim 35;
c) the NFC enabled device that is operable to read the NFC technology of the card or tag;
d) the transport carrier baggage tracking system that is operable to read the machine readable technology of the card or tag and to process and handle the luggage item to which the card or tag is coupled;
e) the transport carrier website or app storing information on the travel account and the card or tag holder including information on one or more biometric markers, the one or more travel reservations and baggage tracking information accessible through the travel account, and the transport carrier website or app operable to directly link the travel account with the transport carrier baggage tracking system;
wherein the NFC enabled device initiates check-in of the luggage item with the transport carrier baggage tracking system by reading the NFC technology of the card or tag so that the permanent code including executable data of the NFC technology directs the NFC enabled device to open the transport carrier website or app and directly delivers the identification data to the transport carrier website or app and the transport carrier website or app directly associates the card or tag with one of the travel reservations of the card or tag holder and automatically links the card or tag to said travel reservation to effect completed check-in of the luggage item to which the card or tag is coupled with the transport carrier baggage tracking system;
wherein the transport carrier baggage tracking system uses the machine readable technology of the card or tag for processing and handling of the luggage item from a departing transportation facility, to a transport vehicle, to a destination transportation facility and to bag claim by the traveler;
wherein baggage status information on the transport carrier website or app is checked during the trip from the NFC enabled device as desired; and
wherein the card or tag is usable for more than one trip and wherein the system does not require writing of data to the NFC technology in the card or tag for each trip given that the identification data and executable data is permanently encoded at a time the card or tag is made and remains permanently in the NFC technology and is not erased and rewritten for each said trip.

47. The system of claim 46 wherein the code of the NFC technology including the identification data is generated in advance and permanently encoded in the card or tag prior to receipt by the card or tag holder who has the card or tag prior to arrival at the departing transportation facility.

48. The system of claim 47 wherein the transport carrier assigns the identification data to the card or tag and associates the identification data with the card or tag holder instead of the identification data being assigned at the departing transportation facility.

49. The system of claim 47 wherein the NFC enabled device has the ability to read the code including the identification data that is permanently stored in the NFC technology and to allow the code to deliver an executable command and drive origination of a check-in event on the NFC enabled device.

50. A method of tracking baggage from a departing destination to an arrival destination during a trip, the method comprising the following steps:
 a) providing the travel account with account identifying information of the card or tag holder that is linkable to the one or more travel reservations and to the transport carrier baggage tracking system;
 b) providing the transport carrier website or app that stores information on, and manages the travel account and the transport carrier baggage tracking system;
 c) providing the card or tag of claim 35 to the card or tag holder, wherein the card or tag is linked to the travel account;
 d) receiving luggage item check-in information from the card or tag and directly and automatically linking the card or tag to one of said one or more travel reservations to complete check-in;
 e) handling and processing the luggage item during the trip of the card or tag holder from the departing destination, to the arrival destination, to bag claim by the card or tag holder, wherein handling and processing of the luggage item includes delivering and updating luggage item status information during the trip to the transport carrier website or app so that the luggage item status information is viewable on the transport carrier website or app using the NFC enabled device of the card or tag holder; and
  wherein the card or tag is usable for more than one trip and wherein the method does not require writing of data to the NFC technology in the card or tag for each said trip given that the identification data and the executable data are permanently encoded at a time the card or tag is made and remains permanently in the NFC technology of the card or tag and are not erased and rewritten with travel information for each said trip.

51. The method of claim 50 wherein the transport carrier generates the executable data including an encoded data set of the NFC technology, including the identification data at a time the card or tag is made, and the encoded data set of the permanent code is permanently encoded in the card or tag prior to receipt by the card or tag holder who has the card or tag prior to arrival at the departing destination.

52. The method of claim 50 wherein the transport carrier assigns the identification data to the card or tag and associates the identification data with the card or tag holder, instead of the identification data being assigned at the departing destination.

53. A baggage tracking card or tag, the card or tag comprising:
 a) Near Field Communication (NFC) technology that is encoded using NFC Data Exchange Format (NDEF) with permanent code including executable data that directly causes a transport carrier baggage tracking system website or software application (app) to open on an NFC enabled device and directly delivers in an NFC encode string identification data that is unique to the card or tag to the transport carrier baggage tracking system website or app, and wherein biometric data is captured by the NFC enabled device, which is then also captured in the permanent code including executable data and delivered to the transport carrier website or app;
 b) machine readable technology that is operable to be read by and used in conjunction with a transport carrier baggage tracking system while processing and handling the luggage item; and
 c) a remote check-in function that directly initiates and causes complete check in of a luggage item having the card or tag coupled thereto with the transport carrier baggage tracking system without a card or tag holder stopping at a bag check-in kiosk or counter at a transportation carrier facility and engaging in check-in steps other than a single step of placing the card or tag in proximity of the NFC enabled device;
 wherein the card or tag is linked to the card or tag holder in a transport carrier baggage tracking system prior to use of the remote check-in function;
 wherein the remote check-in function includes direct delivery of the executable data in the permanent code to the transport carrier baggage tracking system website or app, which directly causes the transport carrier baggage tracking system website or app to associate and automatically link the card or tag with a travel reservation of the card or tag holder, to effect remote and complete check-in of the luggage item with the card or tag coupled thereto for a trip;
 wherein travel data for the trip of the card or tag holder is not written to the card or tag; and
 wherein the machine readable technology is operable to be used in conjunction with and to be read by the transport carrier baggage tracking system.

54. A baggage tracking system comprising:
 a) the card or tag of claim 53;
 b) the NFC enabled device that is operable to read the NFC technology of the card or tag;
 c) the transport carrier baggage tracking system that is operable to read the machine readable technology of the card or tag and to process and handle the luggage item to which the card or tag is coupled; and
 d) the transport carrier baggage tracking system web site or app storing information on a travel account and the card or tag holder, including information on one or more biometric markers of the card or tag holder, the travel reservation and baggage tracking information, and wherein the information is accessible by the card or tag holder through the transport carrier website or app.

55. A method of tracking baggage from a departing destination to an arrival destination during a trip, the method comprising the following steps:

a) providing the transport carrier website or app that stores information on and manages the transport carrier baggage tracking system;
b) providing the card or tag of claim 35 to the card or tag holder, wherein the card or tag is linked to the card or tag holder in the transport carrier baggage tracking system;
c) receiving luggage item check-in information from the card or tag holder and directly linking the card or tag to a said travel reservation; and
d) handling and processing the luggage item during the trip of the card or tag holder from a departing destination, to an arrival destination, to bag claim by the card or tag holder, wherein handling and processing of the luggage item includes delivering and updating luggage item status information during the trip to the transport carrier website or app, and wherein the luggage item status information is viewable on the transport carrier website or app using the NFC enabled device of the card or tag holder.

56. The method of claim 55 wherein after step "c" further comprising a step, if desired by the transport carrier baggage tracking system, of prompting a person checking in the luggage item to enter additional account identifying information on the website or app to confirm that the person checking in the luggage item matches the card or tag holder associated with the account.

57. A method of transporting luggage from a departing locale to an arriving locale comprising the steps of:
a) establishing an account for a traveler with a carrier that includes contact information of the traveler;
b) booking an itinerary with the carrier that is linked to the account established in step "a";
c) obtaining a card or tag that includes identification data that is linked to the account established in step "a" prior to initiating a check-in event and wherein the card or tag includes:
  (i) Near Field Communication (NFC) technology that is encoded using NFC Data Exchange Format (NDEF) with permanent code including executable data for directing an NFC enabled device to open a website or software application (app) of the carrier on the NFC enabled device, wherein the executable data delivers in an NFC encode string the identification data that is unique to the card or tag and linkable to the account, and wherein biometric data is captured by the NFC enabled device, which is then also captured in the permanent code including executable data and delivered to the website or app; and
  (ii) machine readable technology that is operable to be read by and used in conjunction with a baggage tracking system of the carrier;
  (iii) wherein the executable data read by the NFC enabled device launches the website or software app of the carrier on the NFC enabled device, and
  (iv) wherein the NFC enabled device delivers the identification data of the card or tag along with any biometric data captured by the executable data to the website or app of the carrier that links the card or tag to the account of step "a" and to the itinerary of step "b" so that the carrier can track a luggage item associated with the itinerary and verify identity of the traveler;
d) coupling the card or tag to the luggage item of the traveler;
e) initiating a check-in event to cause check-in of the luggage item with the card or tag attached thereto with the carrier in a single step of the traveler placing the NFC enabled device in proximity of the card or tag so that the NFC enabled device reads the executable data of the card or tag of step "c" and delivers the executable data to the website or app where a link is automatically established between the card or tag and the itinerary to complete the check-in event;
f) using the NFC enabled device to also capture live biometric markers of the traveler that are captured by the executable data during step "e" at the time of check-in and delivered to the website or app where the live biometric markers are compared to stored biometric markers in the account to verify identity of the traveler; and
g) dropping the luggage item with the card or tag attached thereto at a designated luggage drop of the carrier; and
wherein steps "e" through "g" are performed without the traveler having to:
  (i) open the website or app of the carrier or input data;
  (ii) stop and/or input data at a kiosk at the departing locale;
  (iii) speak with a counter representative; and
  (iv) write or input information or data to the card or tag.

\* \* \* \* \*